(12) United States Patent
Gupta et al.

(10) Patent No.: US 9,080,882 B2
(45) Date of Patent: Jul. 14, 2015

(54) VISUAL OCR FOR POSITIONING

(75) Inventors: Rajarshi Gupta, Sunnyvale, CA (US); Saumitra Mohan Das, San Jose, CA (US); Hui Chao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 452 days.

(21) Appl. No.: 13/411,085

(22) Filed: Mar. 2, 2012

(65) Prior Publication Data

US 2013/0230208 A1    Sep. 5, 2013

(51) Int. Cl.
| G06K 9/00 | (2006.01) |
| G01C 21/20 | (2006.01) |
| G01C 21/36 | (2006.01) |
| G01S 5/16 | (2006.01) |
| G06K 9/32 | (2006.01) |

(52) U.S. Cl.
CPC .......... *G01C 21/206* (2013.01); *G01C 21/3602* (2013.01); *G01S 5/16* (2013.01); *G06K 9/3258* (2013.01)

(58) Field of Classification Search
CPC .... G01C 21/206; G01C 21/3602; G01S 5/16; G06K 9/3258; G06K 9/00664; G06K 9/72
USPC ........................................................ 382/103
See application file for complete search history.

(56) References Cited

U.S. PATENT DOCUMENTS

| 6,215,441 | B1 | 4/2001 | Moeglein et al. |
| 6,282,426 | B1 | 8/2001 | Wang |
| 6,295,502 | B1 | 9/2001 | Hancock et al. |
| 6,456,239 | B1 | 9/2002 | Werb et al. |
| 6,473,523 | B1 | 10/2002 | Newman et al. |
| 6,493,766 | B1 | 12/2002 | Buchholz et al. |
| 7,414,988 | B2 | 8/2008 | Jones et al. |
| 7,509,215 | B2 | 3/2009 | Shen et al. |
| 7,519,376 | B2 | 4/2009 | Chang |

(Continued)

FOREIGN PATENT DOCUMENTS

| CN | 1307683 A | 8/2001 |
| CN | 1413424 A | 4/2003 |

(Continued)

OTHER PUBLICATIONS

"802.11 Broadcast of Local Info", Submitted by Brad Templeton, Mar. 18, 2005, Brad Ideas: Crazy Ideas, Inventions, Essays and Links from Brad Templeton, http://ideas.4brad.com/archives/000188.html.

(Continued)

*Primary Examiner* — Tom Y Lu
(74) *Attorney, Agent, or Firm* — Hunter Clark PLLC

(57) ABSTRACT

A mobile device can receive OCR library information associated with a coarse position. The coarse position can be determined by the mobile device, or by a network server configured to communicate with the mobile device. A camera on the mobile device can obtain images of human-readable information in an area near the coarse position. The view finder image can be processed with an OCR engine that is utilizing the OCR library information to determine one or more location string values. A location database can be searched based on the location string values. The position of the mobile device can be estimated and displayed. The position estimated can be adjusted based on the proximity of the mobile device to other features in the image.

30 Claims, 13 Drawing Sheets

(56) References Cited

U.S. PATENT DOCUMENTS

| | | | |
|---|---|---|---|
| 8,041,555 B2 | 10/2011 | Buccella | |
| 8,165,599 B1 | 4/2012 | Dronamraju et al. | |
| 8,468,154 B2 | 6/2013 | Leino et al. | |
| 8,718,410 B2* | 5/2014 | Boncyk et al. | 382/103 |
| 8,731,581 B2* | 5/2014 | Blumberg et al. | 455/456.1 |
| 2002/0163907 A1 | 11/2002 | Odenwalder et al. | |
| 2003/0100316 A1 | 5/2003 | Odamura | |
| 2003/0176965 A1 | 9/2003 | Padmanabhan | |
| 2003/0234807 A1 | 12/2003 | Onbe et al. | |
| 2004/0176906 A1 | 9/2004 | Matsubara et al. | |
| 2004/0203880 A1 | 10/2004 | Riley | |
| 2004/0203931 A1 | 10/2004 | Karaoguz | |
| 2004/0224703 A1 | 11/2004 | Takaki et al. | |
| 2004/0249983 A1 | 12/2004 | Bedner | |
| 2005/0059439 A1 | 3/2005 | White et al. | |
| 2005/0117750 A1 | 6/2005 | Rekimoto | |
| 2005/0192024 A1 | 9/2005 | Sheynblat et al. | |
| 2005/0265321 A1 | 12/2005 | Rappaport et al. | |
| 2006/0022048 A1 | 2/2006 | Johnson | |
| 2006/0046709 A1 | 3/2006 | Krumm et al. | |
| 2006/0171588 A1 | 8/2006 | Chellapilla et al. | |
| 2006/0204098 A1 | 9/2006 | Gaast | |
| 2006/0215736 A1 | 9/2006 | Rasmussen | |
| 2007/0001904 A1 | 1/2007 | Mendelson | |
| 2007/0025456 A1 | 2/2007 | McCrady | |
| 2007/0026847 A1 | 2/2007 | Polk et al. | |
| 2007/0037558 A1 | 2/2007 | Yu et al. | |
| 2007/0140595 A1 | 6/2007 | Taylor et al. | |
| 2007/0270122 A1 | 11/2007 | Ewell | |
| 2008/0032706 A1 | 2/2008 | Sheynblat et al. | |
| 2008/0039120 A1 | 2/2008 | Gad | |
| 2008/0101277 A1 | 5/2008 | Taylor et al. | |
| 2009/0003332 A1 | 1/2009 | Flanagan et al. | |
| 2009/0037099 A1 | 2/2009 | Joshi | |
| 2009/0040370 A1 | 2/2009 | Varanasi | |
| 2009/0048820 A1 | 2/2009 | Buccella | |
| 2009/0201208 A1 | 8/2009 | McPherson et al. | |
| 2009/0204319 A1 | 8/2009 | Shanbhag et al. | |
| 2009/0319166 A1 | 12/2009 | Khosravy et al. | |
| 2010/0063889 A1 | 3/2010 | Proctor, Jr. et al. | |
| 2010/0128131 A1 | 5/2010 | Tenchio et al. | |
| 2010/0135178 A1 | 6/2010 | Aggarwal et al. | |
| 2010/0157848 A1 | 6/2010 | Das et al. | |
| 2010/0172259 A1 | 7/2010 | Aggarwal et al. | |
| 2010/0235091 A1 | 9/2010 | Das et al. | |
| 2010/0304755 A1 | 12/2010 | Rice et al. | |
| 2011/0045840 A1 | 2/2011 | Alizadeh-Shabdiz et al. | |
| 2011/0080848 A1 | 4/2011 | Khorashadi et al. | |
| 2011/0081084 A1 | 4/2011 | Takahashi et al. | |
| 2011/0081919 A1 | 4/2011 | Das et al. | |
| 2011/0183626 A1 | 7/2011 | Das et al. | |
| 2011/0190004 A1 | 8/2011 | Tenny et al. | |
| 2011/0201350 A1 | 8/2011 | Das et al. | |
| 2012/0130632 A1 | 5/2012 | Bandyopadhyay et al. | |
| 2012/0289249 A1 | 11/2012 | Bhattacharya et al. | |
| 2012/0293371 A1 | 11/2012 | Lu | |
| 2013/0109413 A1 | 5/2013 | Das et al. | |
| 2013/0122941 A1 | 5/2013 | Das et al. | |

FOREIGN PATENT DOCUMENTS

| | | | |
|---|---|---|---|
| CN | 1448856 A | | 10/2003 |
| CN | 1832513 A | | 9/2006 |
| CN | 101162151 A | | 4/2008 |
| CN | 101162153 A | | 4/2008 |
| EP | 1197111 A1 | | 4/2002 |
| EP | 1258851 A2 | | 11/2002 |
| EP | 1701524 A1 | | 9/2006 |
| JP | 10285640 A | | 10/1998 |
| JP | H11225365 A | | 8/1999 |
| JP | 2001045549 A | | 2/2001 |
| JP | 2001508250 A | | 6/2001 |
| JP | 2001336941 A | | 12/2001 |
| JP | 2002132771 A | | 5/2002 |
| JP | 2002152802 A | | 5/2002 |
| JP | 2002230673 A | | 8/2002 |
| JP | 2003035555 A | | 2/2003 |
| JP | 2003162217 A | | 6/2003 |
| JP | 2003518625 A | | 6/2003 |
| JP | 2003244747 A | | 8/2003 |
| JP | 2003295889 A | | 10/2003 |
| JP | 2004072546 A | | 3/2004 |
| JP | 2005039702 A | | 2/2005 |
| JP | 2005051490 A | | 2/2005 |
| JP | 2005136897 A | | 5/2005 |
| JP | 2006010687 A | | 1/2006 |
| JP | 2006090868 A | | 4/2006 |
| JP | 2007178279 A | | 7/2007 |
| JP | 2007221479 A | | 8/2007 |
| JP | 2007322906 A | | 12/2007 |
| JP | 2008033043 A | | 2/2008 |
| JP | 2008507167 A | | 3/2008 |
| JP | 2008206126 A | | 9/2008 |
| JP | 2008539672 A | | 11/2008 |
| WO | WO0149056 | | 7/2001 |
| WO | WO2004102991 A2 | | 11/2004 |
| WO | 2004104520 A1 | | 12/2004 |
| WO | 2006005790 A1 | | 1/2006 |
| WO | 2006116449 A2 | | 11/2006 |
| WO | WO2007082534 A1 | | 7/2007 |
| WO | 2011095227 A1 | | 8/2011 |

OTHER PUBLICATIONS

Doyle, et al., "Evaluating the benefits of multimodal interface design for CoMPASS—a mobile GIS" Geoinformatica, An International Journal on Advances of Computer Science for Geographic Information Systems, Kluwer Academic Publishers, BO, vol. 14, No. 2, Mar. 10, 2009, pp. 135-162, XP019789295, abstract, sections 1-3.

International Preliminary Report on Patentability—PCT/US2010/027180, The International Bureau of WIPO—Geneva, Switzerland, Jun. 22, 2011.

International Search Report—PCT/US2009/069123, International Search Authority—European Patent Office—Apr. 1, 2010.

International Search Report/Writen Opinion—PCT/US2010/027180—International Search Authority EPO—Jun. 14, 2010.

Smith, "Tesseract OCR Engine, What it is, where it came from," Google Inc, OSCON 2007.

Eissele, M., et al., "Mobile Navigation and Augmentation utilizing Real-World Text", TZI Bericht Nr 44, Sep. 3, 2007, pp. 9-18, XP055059961, Retrieved from the Internet: URL:http://www.tzi.de/fileadmin/resources/publikationen/tzi_berichte/TZI-Bericht-Nr.02.pdf#p.=11 [retrieved on Apr. 17, 2013] section 3.

International Search Report and Written Opinion—PCT/US2013/024248—ISA/EPO—May 16, 2013.

Sanpechuda T. et al., "A review of RFID localization: Applications and techniques", 5th International Conference on Electrical Engineering/Electronics, Computer, Telecommunications and Information Technology (ECTI-CON), May 2008, pp. 769-772, vol. 2, IEEE.

Zaruba G. V., et al., "Indoor location tracking using RSSI readings from a single Wi-Fi access point", Wireless networks, 2007, 221-235, vol. 13 No. 2, Springer-Verlag.

Polk J., et al., "RFC 3825: Dynamic Host Configuration Protocol Option for Coordinate-based Location Configuration Informafion", IETF Network Working Group, Jul. 2004, pp. 1-15.

\* cited by examiner

VISUAL OCR FOR POSITIONING

BACKGROUND

1. Field of Invention

The subject matter disclosed herein relates to determining geographic locations based on visual information obtained through an image capture device.

2. Information

Mobile communication devices are one of the most prevalent consumer owned technologies in the digital information arena. Satellite and cellular telephone services and other similar wireless communication networks are widely available. The capabilities of the mobile communication devices, and the corresponding services, have also expanded to include applications such as image capture, connectivity to the internet, and providing location-based services. One service in this respect is to provide navigation information to a user through a mobile communication device operating in either a stand-alone mode or with assistance from other network-based devices.

Navigation information can be provided through a satellite positioning systems (SPS) such as, for example, the global positioning system (GPS), GLONASS, Galileo and other like Global Navigation Satellite Systems (GNSS). SPS enabled devices, for example, may receive wireless signals that are transmitted by satellites of a GNSS and/or by terrestrial based transmitting devices. The received SPS signals may, for example, be processed to estimate a location, speed, and/or heading of the location-enabled device. For example, a user may be provided with turn-by-turn directions, a map or other navigational information to help a user to navigate to a location.

In some circumstances, however, it can be difficult to determine a location of a device with enough precision to provide useful location and/or navigation information. For example, there may be times when SPS signal and/or other signal reception is inadequate. Consequently, for this and other reasons it may be beneficial to employ techniques that allow for location, navigation, and/or other similar information and/or services to be provided to a user under circumstances where they might otherwise be unavailable.

SUMMARY

An example of a mobile device for providing position information according to the disclosure includes an image capture module, a memory configured to store a received Optical Character Recognition (OCR) library information, such that the OCR library information is based on a coarse location of the mobile device, a processor programmed to calculate a location string value in an image obtained by the image capture module based on the received OCR library information and determine a position based on the location string value.

Implementations of such a device may include one or more of the following features. The memory is configured to store received local information based on the coarse location of the mobile device, and the processor is programmed to determine the position based on the local information. The processor is programmed to send coarse location information. The processor is programmed to calculate a one or more location string values in one or more images obtained by the image capture module based on the received OCR library information, and determine a position based on the one or more location string values. The processor is programmed to output a graphical map of the position to a graphical display. The graphical map includes a point of interest associated with the position.

An example of a method for using a camera to determine the position of a mobile device according to the disclosure includes receiving OCR library information based on a coarse location of the mobile device, obtaining an image including human-readable location information, utilizing the OCR library information to determine a location string value based on the human-readable location information in the image, and determining a position of the mobile device based on the location string value.

Implementations of such a method may include one or more of the following features. Utilizing the OCR library information to determine one or more location string values based on the human-readable location information in the image and determining a position of the mobile device based on the one or more of location string values. The position is a zone of influence. Determining relative position information based on one or more features in the image. Determining relative position information based on a range to a feature in the image.

An example of a location assistance application embodied on a non-transient computer-readable storage medium for enabling a distributed computer system according to the disclosure includes an OCR library code segment configured to store OCR library information associated with a coarse position, such that the OCR library information is configured to constrain a result generated by an OCR engine, and a position information database code segment configured to store local information associated with at least one location string value generated by the OCR engine.

Implementations of such a location assistance application may include one or more of the following features. The position information database code segment includes a fine position database including one or more fine position records each associated with one or more location string values. A measurements code segment configured to store measurement information associated with one or more wireless transmitting devices. The fine position records includes measurement information.

An example of method of providing local information to a mobile device according to the disclosure includes determining OCR library information based on a coarse location of the mobile device, such that the OCR library information includes a word list, sending the OCR library information to the mobile device, receiving at least one location string value from the mobile device, such that the at least one location string value is included in the word list, determining position information based on the at least one location string value, and sending the position information to the mobile device.

Implementations of such a method may include one or more of the following features. Receiving coarse location information from the mobile device. The OCR library information includes a character feature file. The OCR library information includes fixed formatting rules.

An example of a system for determining a location of a mobile device according to the disclosure includes a memory, a processor programmed to determine a coarse location of the mobile device, compute a local information data package based on the coarse location of the mobile device, such that the local information data package includes one or more zones of influence and position reference information associated with each of the zones of influence, and send the local information data package to the mobile device.

Implementations of such a system may include one or more of the following features. The position reference information includes a graphic symbol. The position reference information includes a value associated with a quick response code. The processor is programmed to receive an image file from the mobile device, analyze the image for position reference information, determine a zone of influence based on the position reference information in the image, and send the local information data package, including the determined zone of influence, to the mobile device. The local information data package includes OCR library information. The processor is programmed to send the local information data package in response to a request sent from the mobile device.

An example of a position detecting mobile device according to the disclosure includes means for determining a coarse position of the mobile device, means for capturing position reference information, means for receiving a location information data package, such that the location information data package is based on the coarse position of the mobile device, means for utilizing the location information data package to and the captured position reference information to determine a fine position of the mobile device, and means for displaying the fine position.

Implementations of such a position detecting mobile device may include one or more of the following features. The position reference information is an image of human readable text, and the location information data package includes OCR library information. The position reference information is an image of an area. The position reference information is an image of a Quick Response Code. The position reference information is an electromagnetic signal and the location information data package includes a location and detection range of a transmitter that is a source of the electromagnetic signal. The device may include means for detecting a range to an object, such that the range is used to determine the fine position. The means for determining the coarse position of the mobile device includes a previous SPS location result.

An example of a location assistance system for use in a mobile device network according to the disclosure includes means for determining a coarse position information for a mobile device, means for storing OCR library information associated with the coarse position information, and means for sending a local information data package to the mobile device, such that the local information data package includes OCR library information associated with the coarse position information.

Implementations of such a system may include one or more of the following features. Means for storing local information associated with the coarse position information, and means for sending a local information data package to the mobile device, such that the local information data package includes local information associated with the coarse position information. Means for receiving at least one location string value from the mobile device, means for determining position information based on the at least one location string value, and means for providing the position information to the mobile device. Means for receiving relative position information from the mobile device, and means for determining the position information based on the relative position information.

An example of a non-transitory computer-readable storage medium having data stored therein representing software executable by a computer, the software including instructions to determine a position of a mobile device, according to the disclosure includes instructions for capturing position reference information, instructions for receiving a location information data package, wherein the location data package is based on a coarse position of the mobile device, instructions for utilizing the location information package and the captured position reference information to determine a fine position of the mobile device, and instructions for displaying the fine position.

Implementations of such a computer-readable storage medium may include one or more of the following features. The position reference information is an image of human readable text, and the location data package includes OCR library information. The position reference information is an image of an area. Instructions for detecting a range to an object, wherein the range is used to determine the fine position. Instructions for determining the coarse position of the mobile device.

DETAILED DESCRIPTION

Some example techniques are presented herein which may be implemented in various method and apparatuses in a mobile device to possibly provide for or otherwise support determining a position based on visual information in an image.

Figure 1:
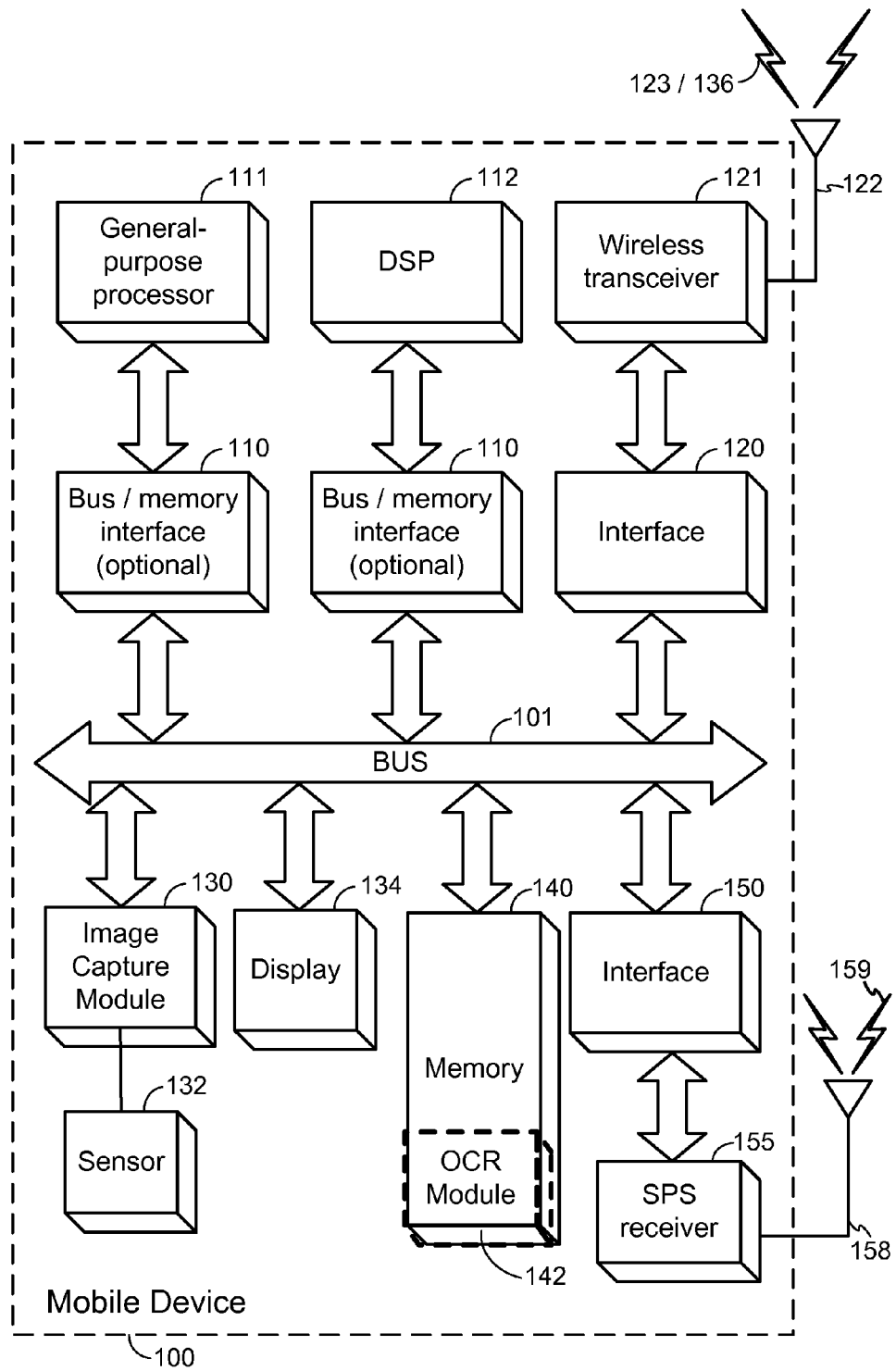
FIG. 1 is a schematic block diagram illustrating an exemplary mobile device capable of obtaining images, communicating with a network and receiving satellite positioning system (SPS) signals.

For example, in certain implementations, as illustrated in FIG. 1, a mobile device 100 may contain a wireless transceiver 121 which is capable of sending and receiving wireless signals 123 via a wireless antenna 122 over a wireless network and connected to a bus 101 by a wireless transceiver bus interface 120. The wireless transceiver bus interface 120 may, in some embodiments be a part of the wireless transceiver 121. Some embodiments may have multiple wireless transceivers 121 and wireless antennas 122 to support multiple standards such as WiFi, CDMA, WCDMA, LTE and Bluetooth.

Also illustrated in FIG. 1, certain embodiments of mobile device 100 may contain an image capture module 130 integrated with the mobile device 100. The image capture module 130 can be configured to receive a signal from a sensor 132 such as a camera chip and accompanying optical path. In general, the image capture module 130 and sensor 132 allow a user to obtain an image, or otherwise transform a visual input to a digital form. The images can be viewed via a graphic display 134. The display 134 can be configured to be a user interface (e.g., touch screen), and allow the user to view video images.

Also illustrated in FIG. 1, certain embodiments of mobile device 100 may contain a Satellite Positioning System (SPS) receiver 155 capable of receiving Satellite Positioning System (SPS) signals 159 via SPS antenna 158. SPS receiver 155 may also process, in whole or in part, the Satellite Positioning System (SPS) signals 159 and use the SPS signals 159 to determine the location of the mobile device. In some embodiments, general-purpose processor(s) 111, memory 140, DSP (s) 112 and specialized processors (not shown) may also be utilized to process the SPS signals 159, in whole or in part, and/or calculate the location of the mobile device 100, in conjunction with SPS receiver 155. The storage of SPS or other location signals may be done in memory 140 or registers.

Also shown in FIG. 1, mobile device 100 may contain DSP(s) 112 connected to the bus 101 by a bus interface 110, general-purpose processor(s) 111 connected to the bus 101 by a bus interface 110 and memory 140, also sometimes connected to the bus by a bus interface 110. The bus interfaces 110 may be integrated with the DSP(s) 112, general-purpose processor(s) 111 and memory 140 with which they are associated. In various embodiments, functions may be stored as one or more instructions or code in memory 140 such as on a computer-readable storage medium, such as RAM, ROM, FLASH, or disc drive, and executed by general-purpose processor(s) 111, specialized processors, or DSP(s) 112. Memory 140 is a processor-readable memory and/or a computer-readable memory that stores software code (programming code, instructions, etc.) configured to cause the processor(s) 111 and/or DSP(s) 112 to perform functions described. In particular, the memory 140 can include an Optical Character Recognition (OCR) module 142. The OCR module 142 can be computer-readable instructions configured to enable the processor 111 to perform optical character recognition on images captured via the image capture module 130. In general, the computer-readable instructions in the OCR module 142 enable the processor 111 to function as an OCR engine.

In general, the mobile device 100 is representative of any electronic device that may be reasonably moved about by a user. By way of example but not limitation, mobile device 100 may comprise a computing and/or communication device such as a mobile telephone, a smart phone, a lap top computer, a tablet computer, a wearable computer, a personal digital assistant, a navigation device, etc.

The mobile device 100 may, for example, be enabled (e.g., via one or more network interfaces) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMax, Ultra Mobile Broadband (UMB), and/or the like.

In other embodiments, functions may be performed in hardware.

Figure 2:
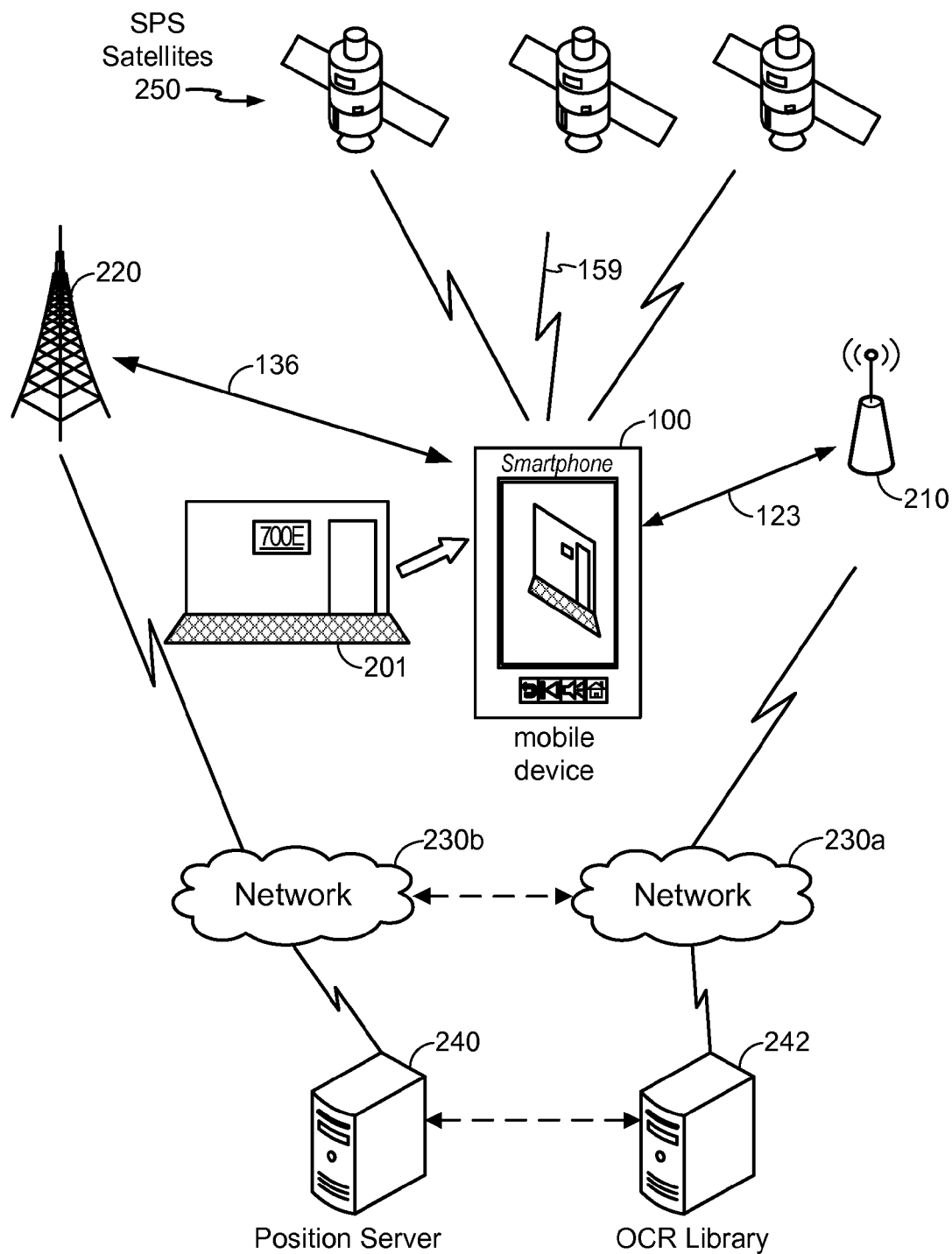
FIG. 2 is a system diagram illustrating certain features of a system containing a mobile device capable of capturing images and communicating over one or more wireless networks.

In certain implementations, as shown in FIG. 2, the mobile device 100 may receive SPS signals 159 from SPS Satellites 250. The SPS Satellites may be from one global navigation satellite system (GNSS), such as the GPS or Galileo satellite systems. The SPS Satellites may be from multiple GNSS such as, but not limited to, GPS, Galileo, Glonass, or Beidou (Compass) satellite systems.

In addition, the mobile device 100 may connect via a wireless signal 136 to a cellular network (e.g., via a cell tower 220). The cellular network may provide access to one or more networks 230a, 230b. Network connectivity may also be available to the mobile device 100 over a wireless transmitter 210 (e.g., an access point/router) via wireless signals 123. The wireless transmitter 210 may connect to one or more networks 230a, 230b. The one or more networks 230a, 230b can include connectivity to the Internet. The networks 230a, 230b include connectivity to a position server 240 configured to send, receive and store position information. An OCR library 242 can be included as part of the position server 240, or may exist in another server and configured to communicate with the position server 240. The OCR library server 242 can be many servers disposed in different areas. The mobile device 100 is configured to obtain and display an image of an area 201 around the device 100. In general, the area 201 can include human-readable information, or other identifiable features, which can be correlated to a geographical position. In an embodiment, an image of the area 201 can be sent to the position server 240 for image processing and feature identification.

Figure 3:
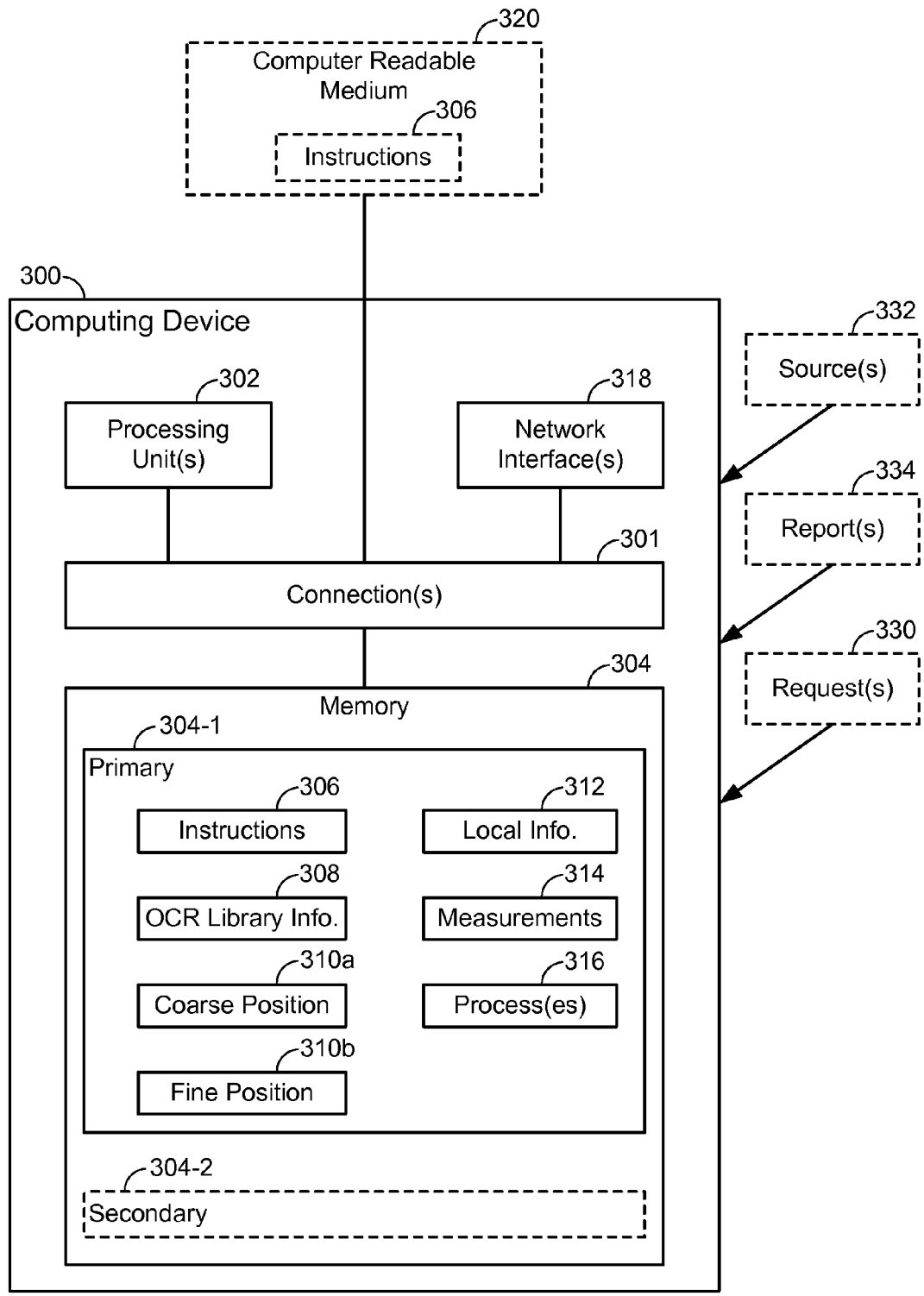
FIG. 3 is a schematic block diagram of a computing device.

Referring to FIG. 3, with further reference to FIG. 2, a schematic block diagram illustrating certain features of a computing device 300 is shown. The position server 240 and OCR library server 242 can include a computing device 300.

As illustrated computing device 300 may comprise one or more processing units 302 to perform data processing coupled to memory 304 via one or more connections 301. Processing unit(s) 302 may be implemented in hardware or a combination of hardware and software. Processing unit(s) 302 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 304 may be representative of any data storage mechanism. Memory 304 may include, for example, a primary memory 304-1 and/or a secondary memory 304-2. Primary memory 304-1 and secondary memory 304-2 may comprise, for example, a random access memory, read only memory, one or more data storage devices or systems, such as, for example, a disk drive, an optical disc drive, a tape drive, a solid state memory drive, etc. The memory 304 may, for example, comprise a data base and/or other like capability. The memory 304 can include elements disposed in different geographic locations. While illustrated in this example as being separate from the processing units, all or part of the memory 304 may be provided within or otherwise co-located/coupled with processing unit(s) 302, or other like circuitry within computing device 300 and/or operatively coupled thereto.

In certain implementations, the memory 304 may be operatively receptive of, or otherwise configurable to couple to, computer readable medium 320. As illustrated, memory 304 and/or computer readable medium 320 may comprise instructions 306 associated with data processing (e.g., in accordance with the techniques provided herein).

As further illustrated, at certain times, memory 304 may comprise data representing OCR library information 308 and coarse position information 310a. The OCR library information 308 may exist in one or more OCR library servers 242. The coarse position information 310a can be associated with a geographical area (e.g., a point, a polygon, a shopping area, a public park). In general, electronic data and information can be associated with objects and other information via field values and indexes. In certain example implementations, the coarse position information 310a may correspond to Location Context Indicator (LCI) in a map database. The computing device 300 may also include fine position information 310b associated with a geographic location. In general, the fine position information 310b includes location information that is more specific when compared to the coarse position information 310a. The fine position information 310b can include data records (e.g., rows in a data table) which can correlate to one or more acceptable recognition results contained within the OCR library information 308. The coarse position information 310a, the fine position information 310b, the OCR library information 308, the local information 312, and other information stored in memory 304 need not be stored in a single position server 240, or a single OCR library server 242, and can be distributed over other servers and accessible via a network interface 318.

In an embodiment, one or more requests 330 may be obtained (e.g., via network interface 318) for OCR library information 308, coarse position information 310a, fine position information 310b, and/or possibly other local information 312. Requests 330 may be received over one or more networks 230a, 230b from one or more mobile devices 100. Computing device 300 may, for example, respond to request 330 by providing all or part of the requested information.

Local information 312 may comprise, for example, location information as submitted or otherwise associated with a source 332 and previously stored, or estimated, location information (e.g., subsequently determined, or reported) with respect to one or more wireless transmitting devices 210, 220. Local information 312 may comprise, for example, location information with respect to one or more geographic areas. Local information 312 can be a room annotation layer of a map database, a geo-referenced map file and other like navigation/position related information. Local information 312 can be information relating to navigation, e.g., information associated with one or more location based services and/or other like capabilities. For example, certain context or other like information associated with a specific geographic region, etc., may be stored in memory 304 (e.g., points of interest, routing information, multimedia files, or other general information associated with a geographic area).

As further illustrated, at times, memory 304 may comprise measurement data 314 associated with one or more signals received by one or more wireless transmitting devices 210, 220. By way of example, measurements 314 may comprise signal strength information, timing information, ranging and/or pseudoranging information, etc. Measurements 314 may, for example, be obtained through one or more reports 334 received via network interface 318 from one or more mobile devices 100 and/or other computing devices. The fine position information 310b may also relate to measurement data 314 alone or in combination with the OCR library information 308.

In certain example implementations, at least a portion of measurements 314 may be used to estimate a location of mobile device 100. Measurements 314 may, for example, also represent information that was carried using one or more wireless signals 123, 136.

For example, a position estimation capability may be provided and/or otherwise supported using one or more processes 316 which may be executed by processing unit(s) 302 and/or other like circuitry of computing device 300.

All or part of a process for estimating a location of mobile device 100 may be performed by a computing device 300 based, at least in part, on measurements 314. In an embodiment, local information 312 can be sent to the mobile device 100, and the process for estimating the location of the mobile device can be performed by the processor 111 (i.e., on the mobile device 100).

While process 316 is illustrated in FIG. 3 as being at least partially stored in memory 304, the process(es) may be operatively provided in whole or part in one or more of processing unit(s) 302 and/or other like circuitry. The computing device 300 may, for example, comprise one or more network interfaces 318 coupled to one or more of connections 301. The network interfaces 318 may be representative of one or more wireless and/or wired network interfaces.

In certain example implementations, one or more reports 334 (e.g., from one or more mobile stations) may identify the presence of a wireless transmitting device 210, 220 that may be newly installed. Location information associated with such a wireless transmitting device may be relayed by a mobile device or possibly discovered though other network connections/resources, and/or otherwise estimated, e.g., using previous location information stored in the mobile device 100 or the position server 240.

Figure 4A:
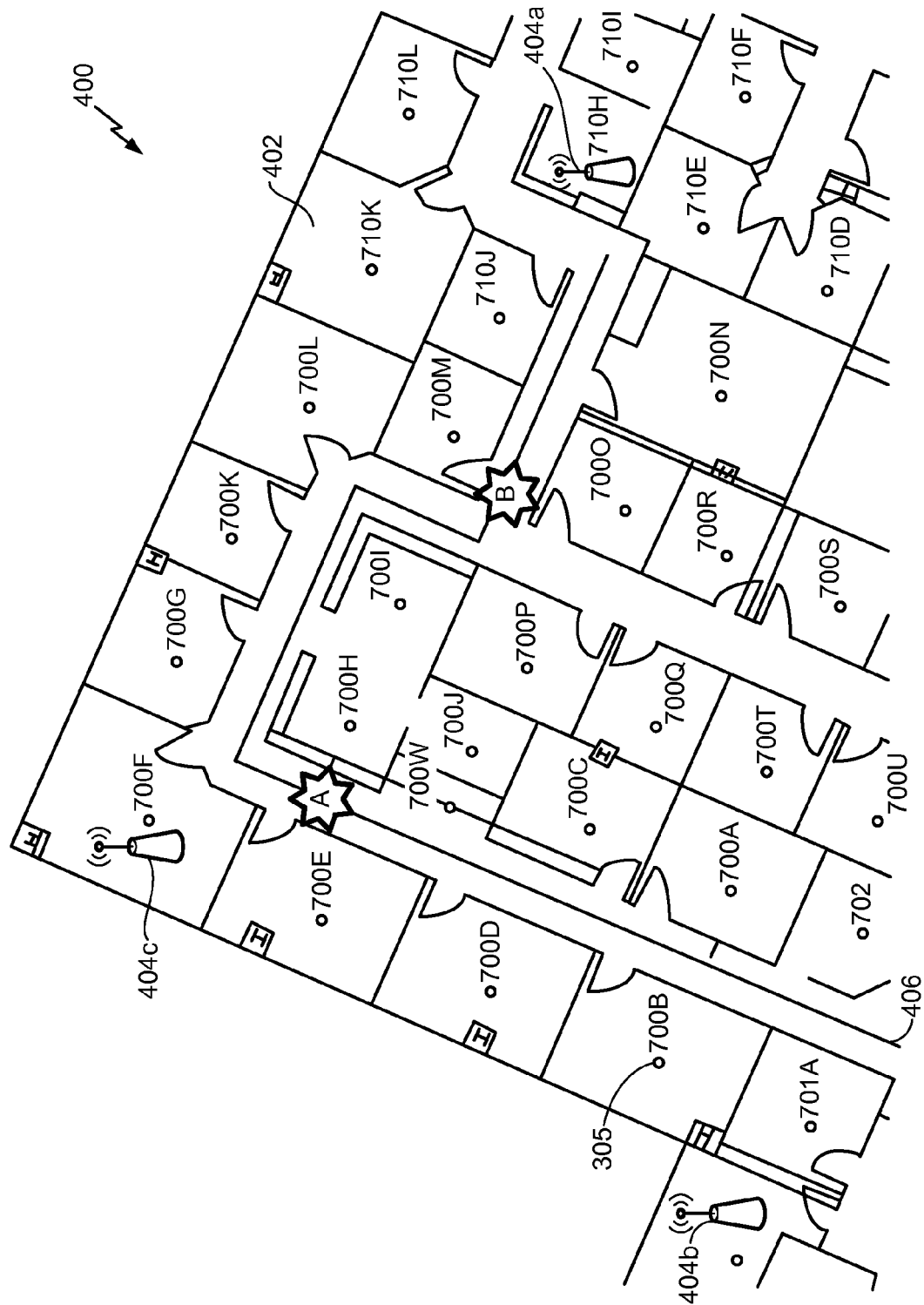
FIG. 4A is a top down view of a building floor plan including a wireless network.

Referring to FIG. 4A, a top down view 400 of a building floor plan 402 including a wireless network is shown. The floor plan 402 is an example of local information 312 that is stored on the position server 240. The floor plan 402 is exemplary only and not a limitation as other stored maps and geographic data can also be stored on a position server 240 and transmitted to a mobile device 100. For example, floor plan 402 can be a map of an office building, amusement park, shopping area, sports arena, convention center, or other map which represents a geographic area. In an embodiment, the floor plan 402 can include a collection of offices with each office being identified with a room number (e.g., 700E, 700L, 701A, 702, 700M), but the room numbers are not necessary. Other geographic landmarks (e.g., information booths, restrooms, attractions, point of interest, etc.) may also be used. The floor plan 402 includes a wireless network with one or more wireless transmitters (e.g., 404a, 404b, 404c) disposed throughout the area. A local information data package including local information 312 (e.g., the floor plan 402) and OCR library information 308 can be transmitted to the mobile device 100 via a network connection (e.g., wireless signals 123, 136) as a function of a coarse position of the mobile device 100. A coarse position can be established via measurement data 314. For example, as a user proceeding along a route 406 within the building associated with the floor plan 402, a local information data package can be sent based on the relative signal strengths of the wireless transmitters 404a, 404b, 404c. The size of the local information data package can be scaled based on the density of unique wireless transmitters. In this way, a user at position "A" can receive the local information data associated with wireless transmitter 404c, while a user at position "B" can receive the local information data associated with wireless transmitter 404a. Other position estimation techniques can also be used such as determining overlap areas for multiple transmitters, including combinations of wireless transmitters 210 and cell towers 220. Coarse position information 310a can also be determined based on cell towers 220, SPS satellites 260 (e.g., active signals, current calculated position, last calculated position), via user input of a current location (e.g., voice command or text entry), and various combinations therein.

The OCR library information 308 in the local information data package can be based on a coarse position of the mobile device. In general, the OCR library information 308 includes program elements such as word lists and character feature files that are utilized by an OCR engine to convert visual information into text data. As an example, and not a limitation, an embodiment of the OCR engine may be able to utilize portions of the OCR library information 308 to improve the recognition accuracy of printed text. The OCR library information 308 can include one or more data files associated with character features (e.g., font types), word lists (e.g., acceptable words), and/or character properties (e.g., fixed formatting rules). In general, the OCR library information 308 constrains the solution sets generated by the OCR engine, which can result in increased recognition results with a decrease in processing cycles for the text elements that are included in the OCR library information 308.

Figure 4B:
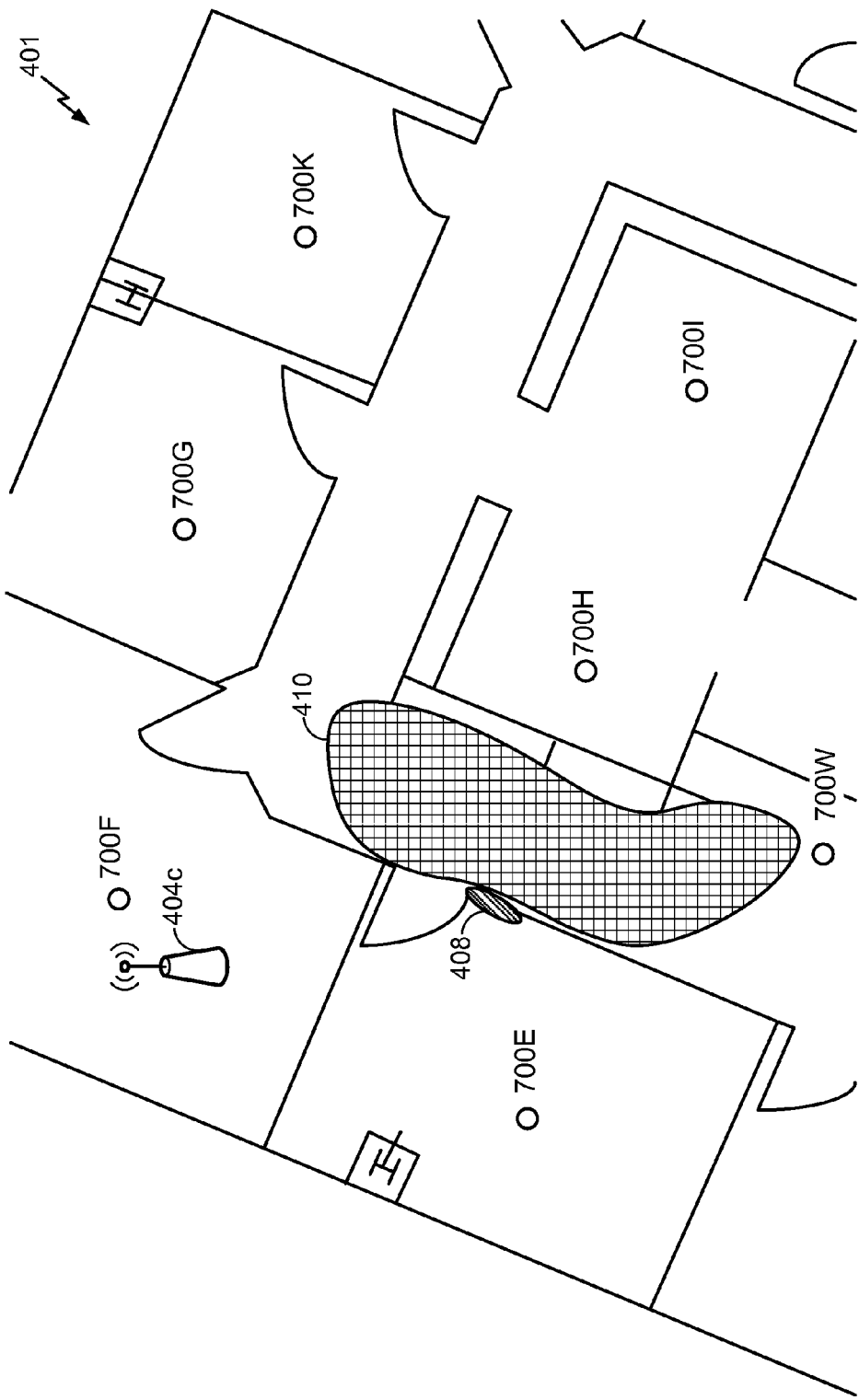
FIG. 4B is a top down view of a portion of the building floor plan of FIG. 3 including a zone of influence.

Referring to FIG. 4B, with further reference to FIG. 4A, a top down view 401 of a portion of the floor plan 402 is shown. The view 401 includes the wireless transmitter 404c, a room identifier 408, and a corresponding zone of influence 410. The presence of a signal from the wireless transmitter 404c can be used to determine a coarse position 310a, and the room identifier 408 can be used to determine a zone of influence 410. In general, a zone of influence is an area from which a room identifier, or other position reference information, can be viewed or sensed. The zone of influence can be derived from mapped data (i.e., via survey), or based on a computed range (i.e., estimate calculation) from the corresponding position reference information. In this example, the zone of influence 410 is a fine position 310b. In another example, a fine position 310b can be determined based on an overlap of multiple zones of influence. The signal strength and other information associated with wireless signals 123, 136 may also be used to determine a fine position 310b.

Figure 5:
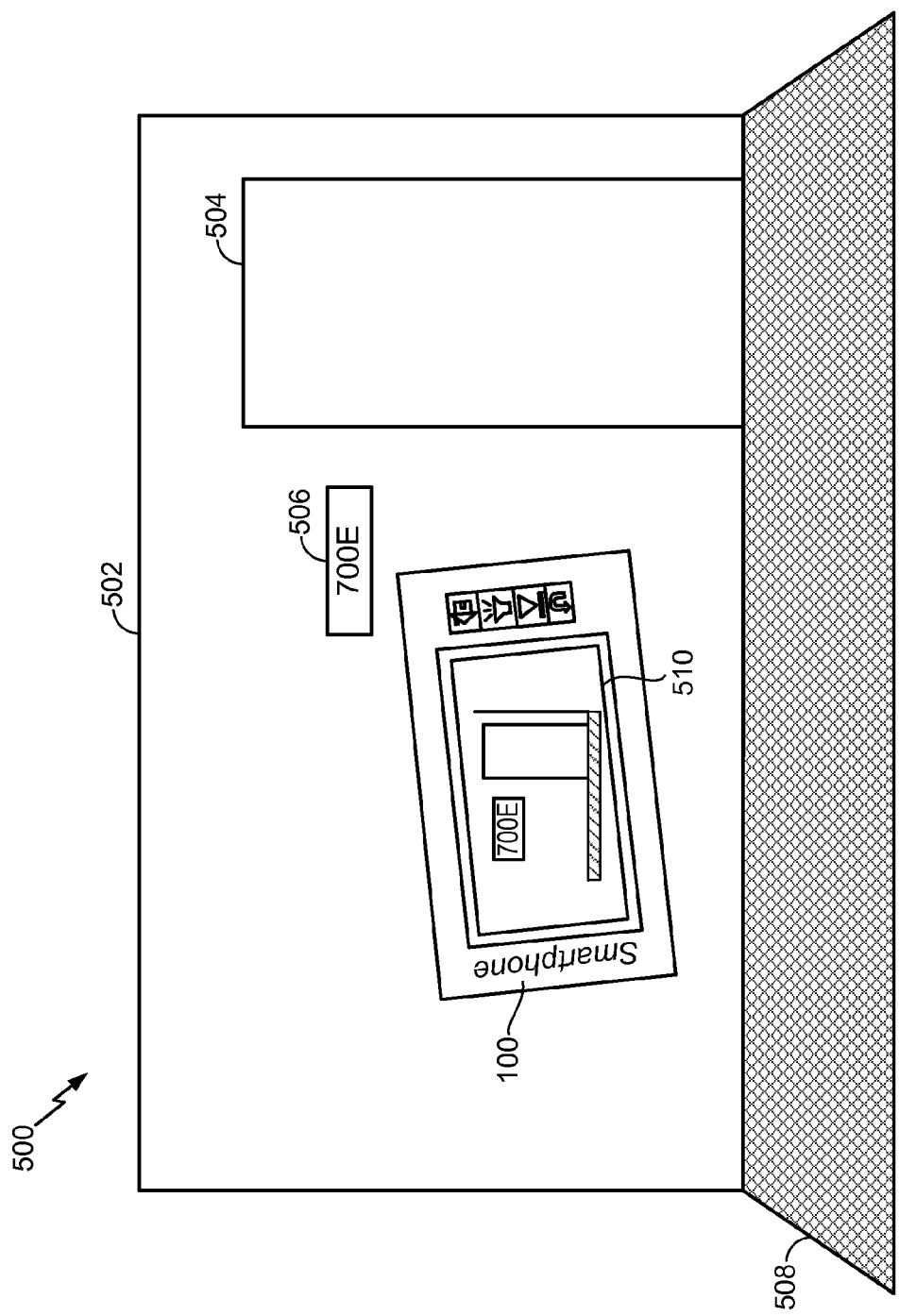
FIG. 5 is an exemplary side view of mobile device capturing an image of an office in the building floor plan of FIG. 3.
Figure 6:
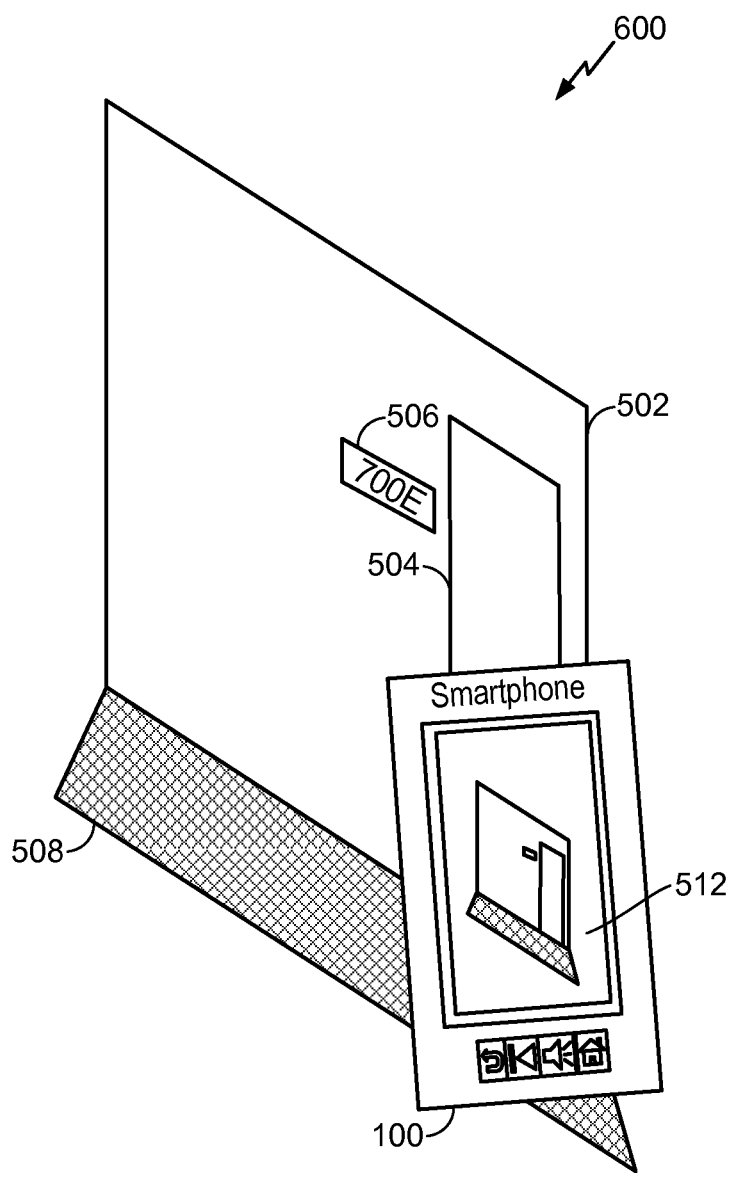
FIG. 6 is an exemplary isometric view of the mobile device and office of FIG. 5.

Referring to FIG. 5, an exemplary side view 500 of a mobile device 100 capturing an image of an office in a building is shown. The view 500 includes a wall 502, a door 504, a room identifier 506, and a section of the hallway floor 508. The mobile device 100 includes an image capture module 130 with a sensor 132 and is configured to display the image on a screen 510 (e.g., the graphic display 134). As an example, and not a limitation, the mobile device 100 is being held such that an image of the wall 502, door 504, room identifier 506, and hallway floor 508 is displayed on the screen 510. The image can include the room identifier 506 alone. The term room identifier as used herein is exemplary only and not a limitation. A room identifier is a general term for human-readable information (i.e., alpha-numeric text) which can be an input to an image recognition algorithm. While view 500 illustrates that the mobile device 100 is orthogonal to the room identifier 506, other viewing angles can also be used. For example, referring to FIG. 6, an image can be obtained when the mobile device 100 is at an acute angle to the room identifier 506 or other features (e.g., door 504, wall 502).

Figure 7:
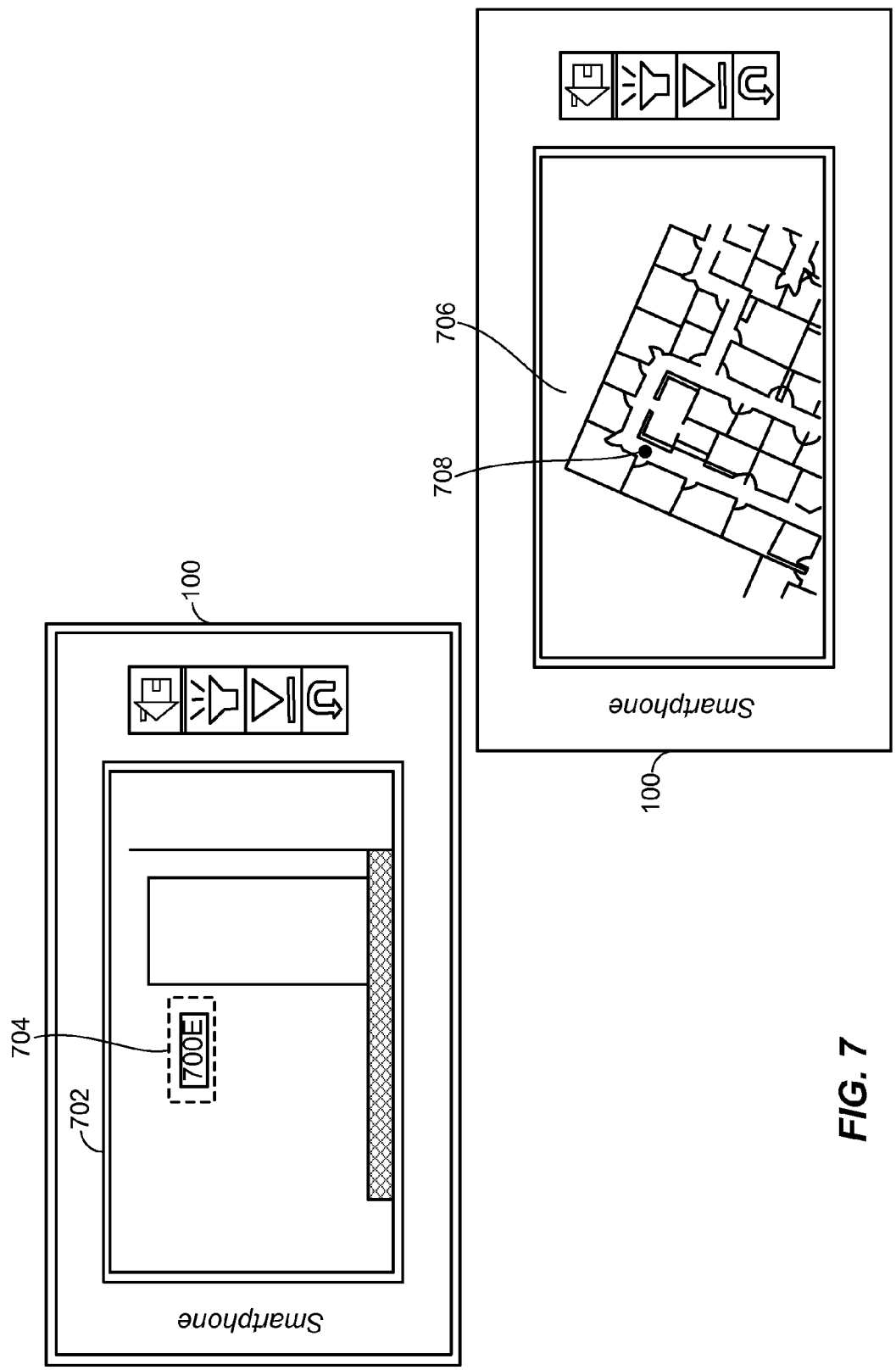
FIG. 7 is a top view of a mobile device displaying an image of an office and corresponding position information.

Referring to FIG. 7, with further reference to FIG. 5, a top view of a mobile device 100 displaying an image of a room identifier 506 and the current position 708 is shown. The mobile device 100 is configured to perform an OCR on the image 702. For example, the characters in the room identifier 704 are analyzed based on OCR library information 308 stored on the mobile device. The selection of the OCR library information 308 can be based on a coarse position determined by the position server 240. In general, in operation, the mobile device 100 can include program instructions for performing positioning with the OCR module 142 in memory 140. When the program is activated, the mobile device 100 can provide information corresponding to coarse position information 310a stored on the position server 240. The mobile device 100 can receive OCR library information 308 which is associated with the coarse position of the mobile device 100. The mobile device 100 is configured to utilize at least a portion of the received OCR library information 308 to convert the text in image 702 obtained via the image capture module 130. The text in the image 702 can be converted to a data string (e.g., "700E") by the OCR engine which is constrained by information in the OCR library information 308. The mobile device 100 can be configured to send the data string to the position server 240 and receive corresponding fine position information 310b from the position server 240. As shown in FIG. 7, the mobile device 100 can be configured to display a map 706 of a floor plan with a current position 708 indicated on a floor plan. In general, the current position 708 can be the center of an area defined by the fine position information 310b, or other predetermined position associated with the fine position information 310b.

Figure 8:
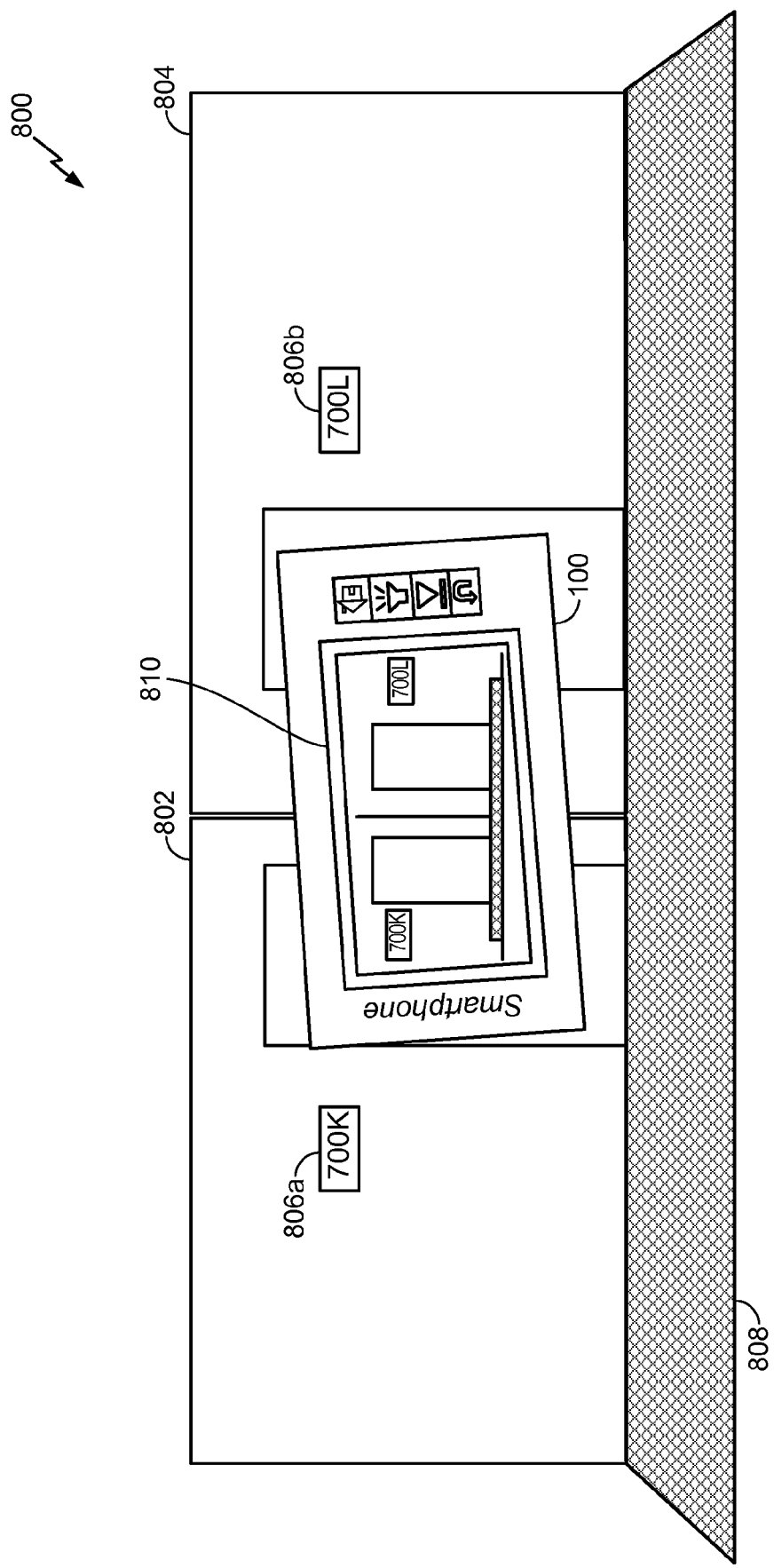
FIG. 8 is an exemplary side view of mobile device displaying an image of multiple offices in the building floor plan of FIG. 3.

Referring to FIG. 8, with further reference to FIG. 3, an exemplary side view 800 of a mobile device 100 capturing an image 810 of multiple offices is shown. The view 800 includes a first wall section 802, a second wall section 804, a first room identifier 806a, a second room identifier 806b, and a floor section 808. As an example, and not a limitation, the sensor 132 in the image capture module 130 of the mobile device 100 can be positioned to obtain an image of both room identifiers 806a, 806b in a single image 810 (i.e., both room identifiers simultaneously in a single image). Images with additional room identifiers (e.g., 3, 4, 5, 6, etc. . . . ) may also be obtained. Multiple images with one or more room identifiers in each image can be obtained from a single point by panning the camera angle. An image file need not be captured and stored in memory 140 before the room identifiers are recognized by the OCR engine. For example, the mobile device 100 can be configured to display an image in near-real time while the mobile device pans (i.e., varies the view angle) from a position. Multiple room identifiers, and other human-readable information, can be processed by the OCR engine as the mobile device pans.

Figure 9:
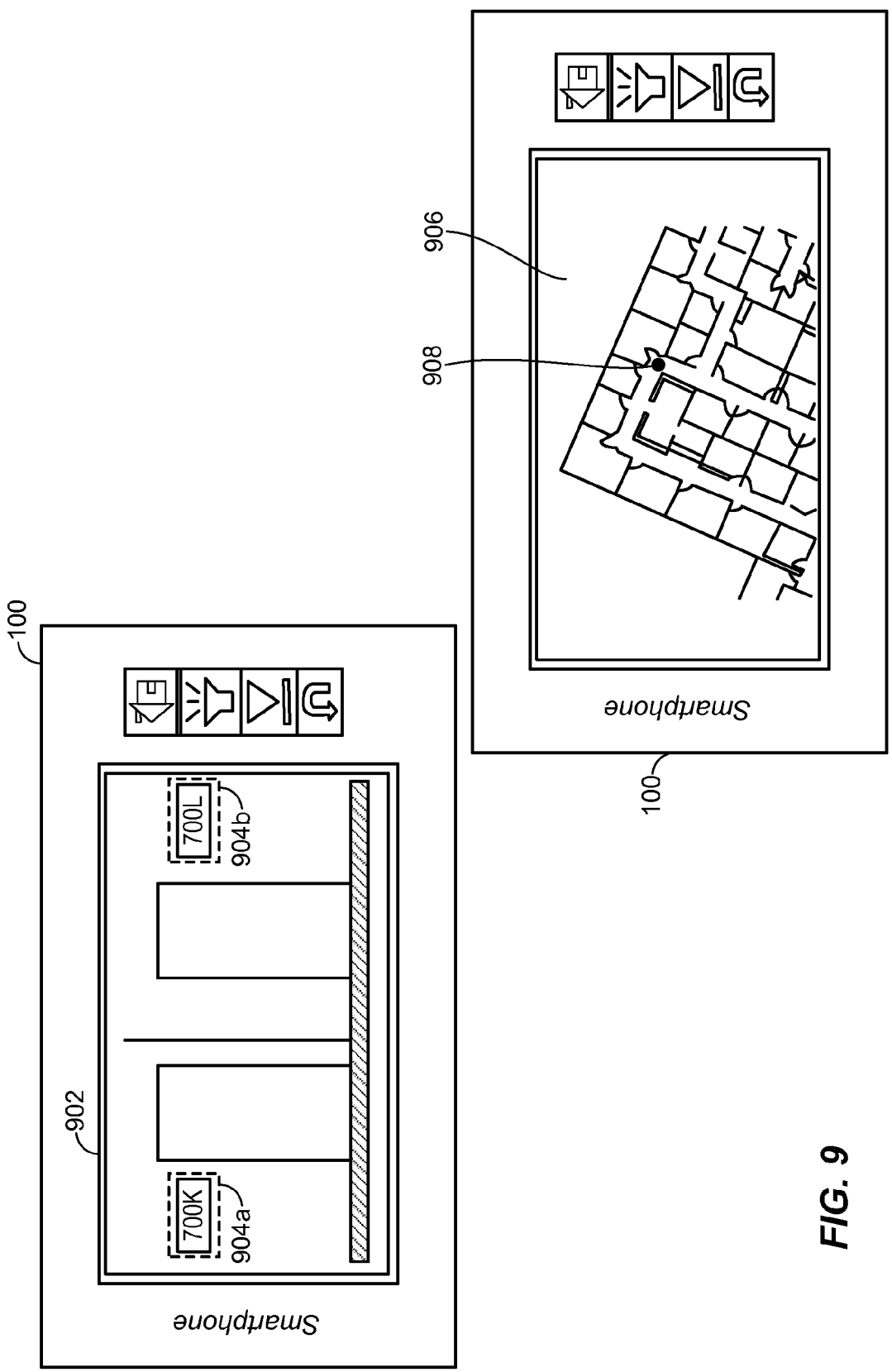
FIG. 9 is a top view of a mobile device displaying an image of multiple offices and corresponding position information.

Referring to FIG. 9, with further reference to FIG. 8, a top view of a mobile device 100 displaying an image 902 of multiple offices is shown. The image 902 can be obtained and an OCR engine can be configured to perform a recognition on the room identifiers 904a, 904b. The OCR engine can perform a recognition based on the display (i.e., without storing an image file in memory 140). The OCR engine can recognize the text in the images of the room identifiers 904a, 904b and produce one or more location strings (e.g., "700K," "700L"). The location strings can correspond to one or more fine positions 310b in memory. For example, a first fine position information can be associated with a string "700K," and a second fine position information can be associated with a string "700L." A third fine position can be associated with both strings (e.g., "700K" and "700L"). The third fine position can be defined by the combination of the first and second fine positions (i.e., a union), the overlap of the first and second fine positions (i.e., an intersection), or other area. The fine position information 310b can be processed and displayed as a position icon 908 on the image of the floor map 906.

Figure 10:
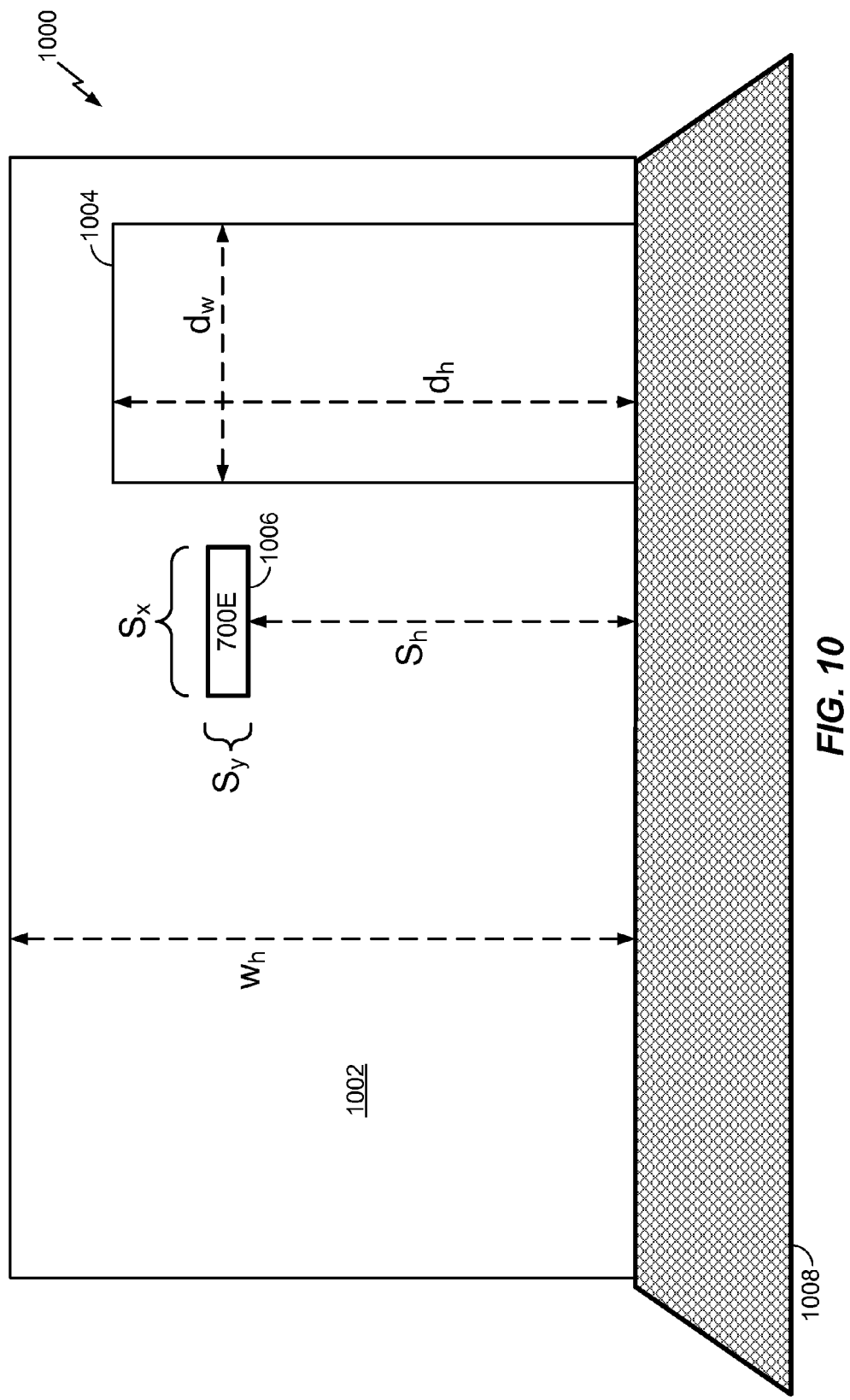
FIG. 10 is a side view of an office with exemplary feature dimensions.

Referring to FIG. 10, a side view 1000 of an office with exemplary feature dimensions is shown. The view 1000 includes a wall portion 1002, a door 1004, a room identifier 1006, and a floor portion 1008. These features are exemplary only and not a limitation as other features may be used. The wall portion 1002 has at least a height dimension $w_h$. The door 1004 can have height and width dimensions $d_h$ and $d_w$ respectively. The room identifier 1006 can be a portion of text (e.g., human-readable information) on a background in the form of a standardized plaque that is common for each office/area in an office building or complex. In an embodiment, the room identifier 1006 can include geometric shapes, colors, or other machine-recognizable information. The room identifier 1006 can have height and width dimensions $s_y$ and $s_x$ respectively. The room identifier can also have a height from floor value $s_h$, indicating the distance between the identifier 1006 and the floor 1008. The height, width and height from floor dimensions can apply only to the text portion of the room identifier (i.e., the numbers without a background). The font and character types in the room identifier 1006 can be associated with portions of the OCR library information 308. For example, the character feature files in the OCR library information 308 can be constrained to include only data associated with the types of characters of room identifiers in a coarse area. In an example, the word list in the OCR library can be constrained to the list of possible room identifiers in a coarse area (e.g., 700A, 700B, 700C, 700D, 700E, etc. . . . ). The OCR engine can be configured to recognize a limited set of text strings as compared to a larger OCR system which attempts to recognize any and all text strings.

The dimensions associated with the features can be used by the mobile device 100 to refine the position estimate. For example, once a zone of influence or fine position for the mobile device 100 is established based on the OCR processing of the room identifier 1006, the actual position can be further refined based on the relative size of one or more of the dimensions in FIG. 10 (e.g., $w_h$, $d_h$, $d_w$, $s_h$, $s_x$, $s_y$). An image processing algorithm stored in memory 140 and executing on the processor 111 can use edge detection techniques to determine the boundaries of the features and calculate the corresponding dimensions. Trigonometric functions in combination with features of the image capture module 130 (e.g., magnification, screen resolution, pixel size, estimated height of eye) and local information 312 can be used to determine the distance from the features (e.g., the wall 1002, the door 1004, a room identifier 1006, or combinations therein). The actual dimensions of the features can be stored as local information 312 that is associated with a coarse position 310a or fine position 310b. The local information 312 can be sent to the mobile device 100 with the OCR library information 308. The refined position estimate can be displayed to the user via a map on the mobile device 100 such as depicted in FIG. 7.

Figure 11:
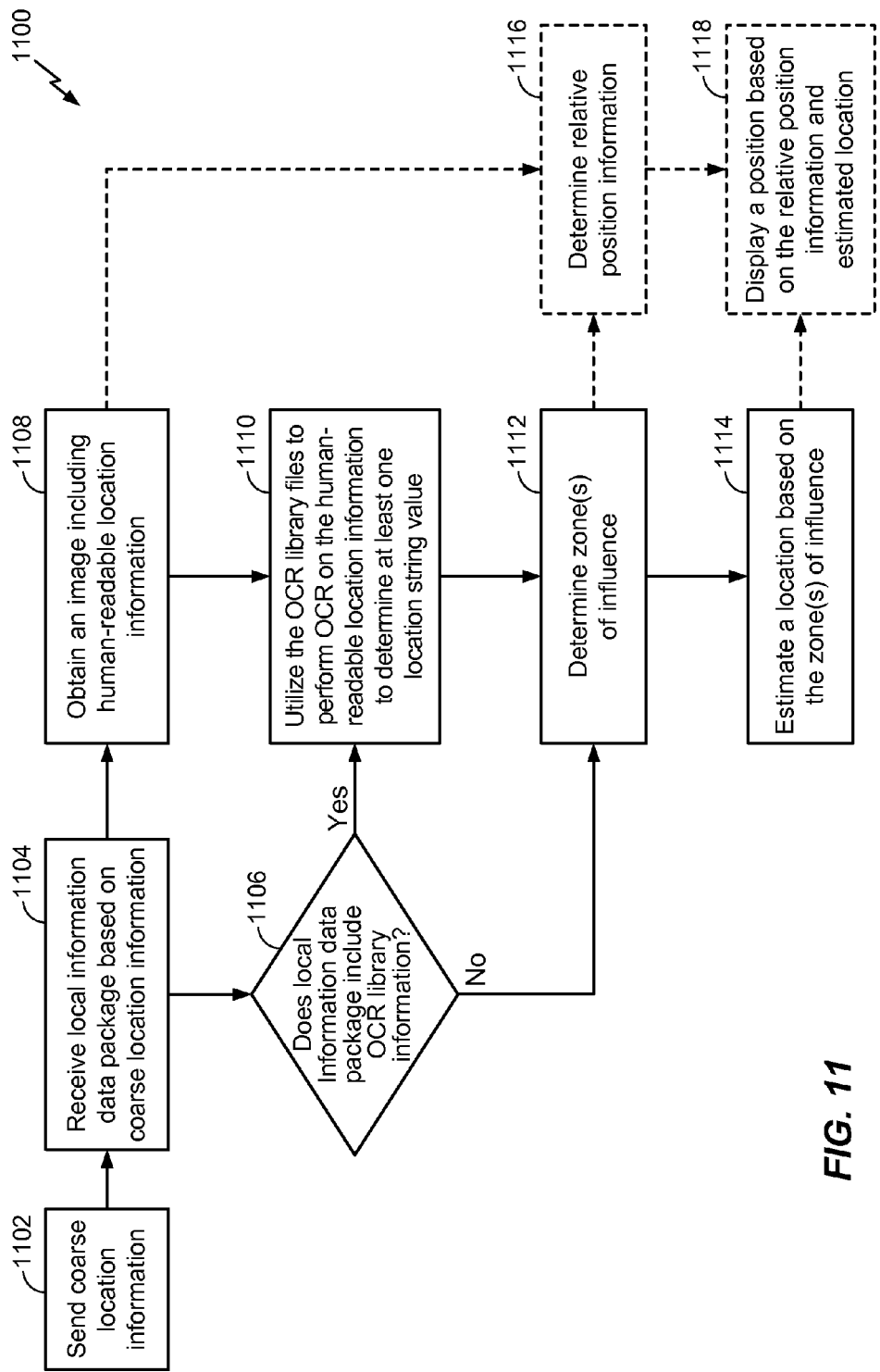
FIG. 11 is a block flow diagram of a process for determining a location based on OCR information.

Referring to FIG. 11, with further reference to FIGS. 1-10, a process 1100 for determining a location based on OCR information includes the stages shown. The process 1100 is, however, an example only and not limiting. The process 1100 can be altered, e.g., by having stages added, removed, rearranged, combined, and/or performed concurrently. For example, stage 1102 described below for sending coarse location information is optional because the position server 240 can be configured to determine the coarse location information of a mobile device 100 based on other information (e.g., sources 332, position estimates, a last reported position). For example, the location of the mobile device 100 can be determined directly by the network, such as based upon what cell tower 220 or access point 210 is communicating with or through. The mobile device 100 can be configured to receive a local information data package at stage 1104 automatically based on a coarse position of the mobile device 100 as determined by the position server 240.

At stage 1102, the mobile device 100 can optionally send coarse location information to a position server 240. As an example, and not a limitation, the coarse location information can be based on SSID information associated with a wireless transmitter 210, a cell tower identifier associated with a cell tower 220 (e.g., a base station identifier), and geographic information associated with signals 159 received from the satellites 250. The coarse location of the mobile device 100 can be based on a prior location or determined by various means such as GNSS trilateration, network trilateration, or access point trilateration. Coarse location information can be obtained from a user of the mobile device 100 by typing, selecting, speaking, or otherwise manually indicating a coarse location. For example, the user can input a coarse location via an audio interface by speaking a general location (e.g., "I am at the UTC mall," "I am at Qualcomm stadium," "I am at Torrey Pines golf course."), or user may select a location from a list of indoor locations in a menu (e.g., selecting from a choice of buildings within a cell Max Antenna Range (MAR)). In an embodiment, the coarse location of a mobile device 100 can be determined by the position server 240 based on sources 332 (e.g., active user list associated with a transmitter), measurements 314 associated with the mobile device 100, and reports 334.

At stage 1104, the mobile device 100 can be configured to receive a local information data package, including OCR library information 308 and local information 312, based on coarse location information. In general, the local information data package includes digital information sent over a network. The coarse location information received at stage 1102, or determined by the position server 240, can correspond to the previously stored coarse position information 310a. The local information 312 and OCR library information 308 can be associated with the coarse position information 310a (e.g., by data field values, index pages). The local information 312 and OCR library information 308 can be received by the mobile device 100 based on a request 330, or can be pushed by the position server 240 based on preprogrammed requirements (e.g., subscription service, location based services, location triggers).

The local information 312 can include geo-referenced graphic files such as floor plans, maps, photographs, and other multimedia files. In an embodiment, the local information 312 can include a set of possible zones of influence and fine positions 310b that are associated with the coarse location information (i.e., stage 1102). Local information 312 can include map data layers such as room annotation information, points of interest, emergency routes, warnings, and other information which can be associated with a geographic location. Local information 312 can include a temporal component (i.e., based on a time of day). For example, routing information can be sent based on a time a security door is open, or a time when construction is scheduled. Other location services can be received as local information.

The OCR library information 308 can include data files associated with character features, word lists, and other character properties. In general, the OCR library information 308 constrains the result sets of the OCR engine operating on the mobile device 100 in an effort to improve the recognition results without increasing the process cycles.

At stage 1106, the mobile device 100 can determine whether the received local information data package includes OCR library information 308. If the OCR library information is included, then the mobile device 100 can be configured to perform an OCR process at stage 1110. If the local information data package does not include OCR library information, then a zone of influence can be determined based on the received local information at stage 1112.

At stage 1108, the mobile device 100 can utilize the sensor 132 of the image capture module 130 to obtain an image of human-readable location information. As examples, and not limitations, such location information can include room numbers, corporate and individual names (e.g., a name on the door), airport terminal signs, street signs, billboards, logos, trademarks, stadium section markers, yardage markers on a golf course, deck and frame markers on a cruise ship, seat numbers on an airplane boarding pass, and other human-readable information that can be associated with a location. An image can be obtained by activating the image capture module 130 and pointing the mobile device such that the human-readable information is in the view screen. Features of the image capture module 130 such as autofocus, flash lighting, and zoom may also be used. The image can be stored in memory for subsequent processing (e.g., as an image file) or can be processed during display (e.g., in the camera viewfinder without creating an image file).

At stage 1110 the mobile device 100 can utilize the OCR library information 308 received at stage 1104 to recognize human-readable location information to determine a location string value. For example, the mobile device 100 can include a cropping utility to isolate a portion of the image to identify the human-readable location information. The cropping utility can be manual (e.g., by selecting an area of the image via a touchscreen), or automatic (e.g., edge detection, auto-cropping). The OCR engine on the mobile device 100 can utilize the word lists and character feature files in the OCR library information 308 to produce one or more location string values. Other OCR techniques can be used by the OCR engine to produce the location string values. For example, the received OCR library files can include matrix matching information (e.g., a collection of character patterns) and feature extraction information (e.g., abstract features present in the characters).

The OCR library information 308 provided by the position server 240, the OCR library server 242, or other network resource, can improve the recognition results by constraining the acceptable result sets. In general, mistakes in a large library (i.e., unconstrained) OCR system can include symbol splitting (e.g. B to I3), symbol confusion (e.g., e and c) and word splitting (e.g., airport to air port). In an example, the character feature files of the OCR library can allow the OCR engine to reject nonconforming results. Thus, if human-readable location information associated with a coarse position includes the character "B," but does not include the characters "I3," then the resulting location string value can be biased to resolve a "B." Similar constraint biasing can occur for symbol confusion and word splitting issues.

At stage 1112, one or more zones of influence 410 can be determined based on the local information 312, and one or more location string values if available. The zone of influence 410 can be fine position information 310b. If one or more location string values are available, the zone of influence 410 can be stored as one or more data fields which define an area (e.g., a polygon) based on the probable viewing area of the human readable location information (e.g., room number 408). The zone of influence data fields can also include a location string value, and can be associated with coarse position information 310a. The zone of influence data fields can be received by the mobile device 100 as local information. For example, the received local information data package can include a collection of data fields which represent several zones of influence (i.e., the possible zones of influence within an area defined by the coarse location information) and the associated location string values. Thus, one or more zones of influence can be stored in memory 140 and selected locally (i.e., on the mobile device 100) based on the location string value.

In an embodiment, the zone of influence can be received by the mobile device 100 after one or more location string values are determined at stage 1110 and then sent to the position server 240. That is, the position sever 240 can determine the zone(s) of influence remotely based on receiving the location string information from the mobile device 100. For example, the mobile device 100 can utilize the received OCR library information 308 to generate a location string value at stage 1110, and then send the location string value to the position server 240. In response, the position server 240 can send the zone(s) of influence to the mobile device 100 at stage 1112.

If the local information data package received at stage 1104 does not include OCR library information, then at stage 1112 one or more zones of influence can be determined based on the local information 312 alone. For example, local information 312 can include one or more zone(s) of influence and probability factors based on the likely position of a mobile device within the coarse location. In an embodiment, the local information 312 can include historical position information associated with a mobile device 100 and the zone of influence calculation can include the historical position information. The local information 312 in the local information data package can include other data which is correlated to a geographic position, but is not dependent on an OCR process. For example, the local information 312 can include zones of influence associated with position reference information such as graphic symbols, images, geometric shapes, colors of features (e.g., wall 502, room identifier 506, door 504, floor 508), and other distinctive attributes which can be detected by the image capture module 130. Position reference information can also be one or two-dimensional bar code information (e.g., Quick Response Code) and detection ranges associated with RFID transmitters, WiFi hotspots, or other electromagnetic signals which can be sensed by the mobile device 100. The position reference information can be used to determine a zone of influence (i.e., the position reference information corresponds to zones of influence).

At stage 1114 the mobile device 100 can estimate a location based on one or more zones of influence. In an embodiment, a zone of influence represents the geographic area from which the human-readable location information can be viewed. In an example, the location estimate can be the center of the geographic area defined by the zone of influence. Other biasing information can be included in the local information 312 and used for determining the location estimate (e.g., assuming the user is in the center of the hallway, assuming the user is orthogonal to the human-readable location information). For a single location string value, in absence of additional information (e.g., measurements 314, processes 316, relative position information at stage 1116), the fine position information 310*b* and zone of influence are coincident. For multiple location string values, or the presence of additional information, the fine position information 310*b* can be a smaller area than the zone of influence. In this case, the location estimate can be the center of the geographic space defined by the appropriate fine position information. Various combinations of zones of influence and fine position information 310*b* can be received by the mobile device 100 as local information at stage 1106, and the determining and estimating stages (i.e., 1112, 1114) can be performed locally (i.e., with the general purpose processor 111). In an embodiment, the position server 240 can return the location estimate to the mobile device 100 (i.e., remote processing).

At stage 1116, the mobile device 100 can be configured to determine relative position information based on one or more features in the image obtained at stage 1108. As indicated by the dashed lines on FIG. 11, stage 1116 is optional. The algorithms for determining the distance to a feature can vary based on the hardware configuration of the mobile device 100. For example, the image capture module 130 may include an auto-focus process with an infra-red transmitter and sensor to measure distance (i.e., a range to a feature in an image). A range to a feature can also be computed with an auto-focus process which utilizes image sharpening algorithms (i.e., the final location of the focus setting is related to the distance of the object in the view finder). The processor 111 can be configured to execute edge detection algorithms on the image and compute pixel distances between features in the image. The pixel distances, the known feature dimensions, and magnification factors associated with the image capture module 130 can be used to compute the distance to the feature. Dimension values associated with the human-readable location information and surrounding area (e.g., doors 1004, room identifier 1006, floor 1008, walls 1002) can be received in the local information data package at stage 1104. In an embodiment, the dimensional values can be based on industry standards (e.g., standard door height and width) and stored in memory 140. The computed distances can be compared with one or more of the dimensional values to determine the relative position of the mobile device. The relative position can be used to modify the location estimate determined at stage 1114.

At stage 1118, the position of the mobile device 100 can be displayed based on the relative position information determined at stage 1116 and the estimated position determined at stage 1114. For example, if a zone of influence 410 extends around a location with human-readable location information for approximately 30 feet, and the relative position information indicates that the camera is approximately 10 feet from the location, then the position can be displayed based on a zone of influence which extends 10 feet from the location.

Figure 12:
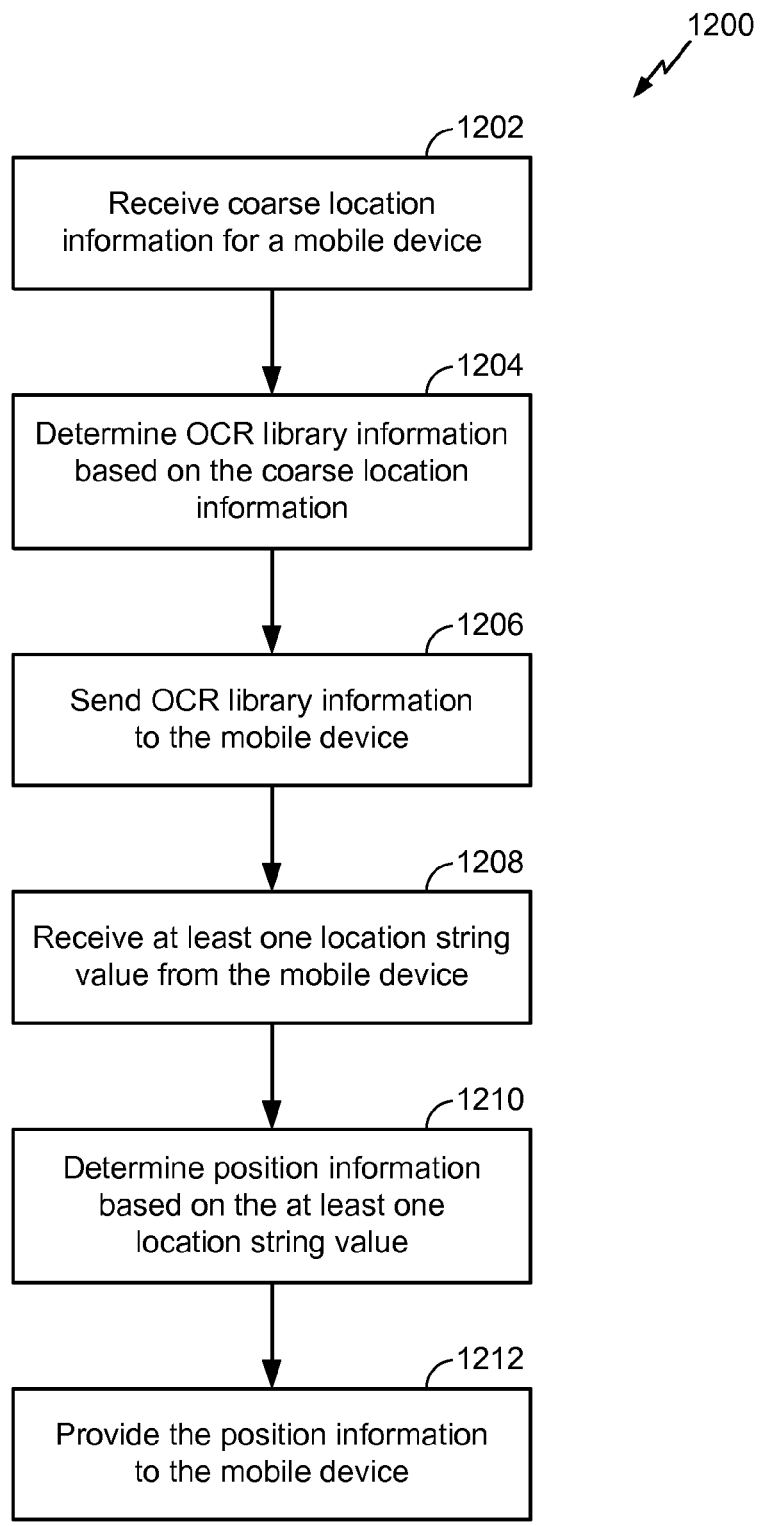
FIG. 12 is a block flow diagram of a process for providing location information to a mobile device.

Referring to FIG. 12, with further reference to FIGS. 1-11, a block flow diagram of a process 1200 for providing location information to a mobile device is shown. The process 1200 is, however, an example only and not limiting. The process 1200 can be altered, e.g., by having stages added, removed, rearranged, combined, and/or performed concurrently. For example, stage 1202 described below for receiving coarse information is optional as the position server 240 can be configured to determine coarse location information for one or more mobile devices.

At stage 1202, a position server 240 can receive coarse location information for a mobile device 100. For example, the coarse location of the mobile device 100 can be determined based upon what cell or access point the mobile is connected to/detected by. This can be done in the network, for example, through an HLR (Home location register) or on the mobile device 100 by looking up the cell or access point in a base station/access point almanac. The mobile device 100 can determine a coarse location and send it to the position server 240 via a network 230*a*, 230*b*. The position server 240 can be configured to determine coarse location for the mobile device 100 based on other information (e.g., measurement data 314, reports 334).

At stage 1204, the position server 240 can determine the OCR library information 308 to use based on the coarse position of the mobile device 100. The OCR library information 308 can be selected based on, for example, a radius from a fixed geographic location, the proximity of the mobile device 100 to a building, the identity of a transmitter 210, 220, or other context identifier. The position server 240 can query one or more OCR library servers 242 for the OCR library information 308 based on the coarse position of the mobile device 100. In general, the OCR library information 308 can be stored in memory 304 as a database or similar flat file structure. For example, word list files, character feature files, and other constraints can persist within an accessible data structure (e.g., relational database, flat files). The data structure can be indexed and retrieved based on coarse location information.

At stage 1206, the position server 240 can send the OCR library information 308 to the mobile device 100 via one or more networks 230*a*, 230*b*. The OCR library information 308 can be sent automatically (i.e., without an express request from the user), or on demand (i.e., with a request from the user). As described above, the OCR library information 308 works with an OCR engine operating on the mobile device 100 to help improve the recognition results for the expected human-readable location information in proximity to the coarse position information. The OCR library information 308 can be indexed by coarse location and stored in the mobile device 100 (e.g., memory 140). The processor 111 can be configured to access the location specific OCR library information 308 when the mobile device 100 is in the corresponding location.

In an embodiment, the mobile device 100 can send an image file, and the position server 240 can be configured to perform the OCR on the image file. In this case, the position server 240 can select the OCR library information 308 and compute the location string value locally. The position server 240 can provide the resulting position information to the mobile device 100.

At stage 1208, the position server 240 can receive one or more location string values from the mobile device 100. The received location string values can correspond to data fields associated with fine position information 310*b* and local information 312. For example, a location string value can correspond to a room number, a name, a door sign (e.g., "Exit"), or any other output from the OCR engine on the mobile device 100. In an embodiment, the mobile device can also send relative position information (i.e., distance from a feature, relative size of the feature) with the location string value.

At stage 1210, the position server 240 determines position information based on the received location string value(s). The coarse location information may also be used in determining the position information. Position information can include fine position information 310*b*, a position estimate, or other location information associated with the location string value or relative position information. For example, the position information can include a fine position associated with the location string, as well as graphical map files, points of interest, and routing information for an area encompassing the fine position. The relative position information may also be used to determine a fine position. At stage 1212, the position server 240 can provide the position information to the mobile device 100 via one or more networks 230a, 230b.

In an embodiment, the mobile device 100 can send an image file to the position server 240. The image file can include features in within an area 201 which can be analyzed without an OCR engine. For example, the image file can be analyzed for geographic shapes, colors, or other distinguishing features which are associated with position information. An image of a corporate sign, a building face, a landmark, or general street view can be used. Image processing algorithms on the position server 240 can recognize, or score, one or more received images and determine the appropriate position information. The position information can then be sent to the mobile device.

Reference throughout this specification to "one example", "an example", "certain examples", or "example implementation" means that a particular feature, structure, or characteristic described in connection with the feature and/or example may be included in at least one feature and/or example of claimed subject matter. Thus, the appearance of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "analyzing", "obtaining", "identifying", "associating", "selecting", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. In still other memory devices, a change in physical state may involve quantum mechanical phenomena, such as, superposition, entanglement, or the like, which may involve quantum bits (qubits), for example. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A computer-readable (storage) medium can be organized into one or more code segments and typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state. In general, a code segment is one or more computer-executable instructions stored in a computer-readable storage medium, or other memory device.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A mobile device for providing position information, comprising:
    an image capture module;
    a memory configured to store a received Optical Character Recognition (OCR) library information and a local information, the OCR library information and the local information being based on a coarse location of the mobile device, wherein the OCR library information includes a character feature file and the local information includes one or more feature dimensions;
    a processor programmed to:
        send the coarse location of the mobile device;
        receive the OCR library information and the local information;
        calculate a location string value in an image obtained by the image capture module based on the received OCR library information;
        determine a zone of influence based on the location string value;
        determine a boundary of one or more features in the image; and
        determine a position based on the zone of influence, the boundary of the one or more features in the image, and the one or more feature dimensions included in the local information.

2. The mobile device of claim 1, wherein the processor is further configured to calculate a plurality of location string values in one or more images obtained by the image capture module based on the received OCR library information, and determine the zone of influence based on the plurality of location string values.

3. The mobile device of claim 1, comprising a graphical display, wherein the processor is programmed to output a graphical map of the position to the graphical display.

4. The mobile device of claim 3, wherein the graphical map includes a point of interest associated with the position.

5. A method for using a camera to determine the position of a mobile device, comprising:
    receiving OCR library information based on a coarse location of the mobile device, wherein the OCR library information includes a character feature file;
    receiving local information based on the coarse location of the mobile device, wherein the local information includes one or more feature dimensions;
    obtaining an image including human-readable location information and at least one feature;
    utilizing the OCR library information to determine a location string value based on the human-readable location information in the image;
    determining a zone of influence based on the location string value;
    determining a boundary of the at least one feature; and
    determining a position of the mobile device based on the zone of influence, the boundary of the at least one feature, and the one or more feature dimensions included in the local information.

6. The method of claim 5 comprising utilizing the OCR library information to determine a plurality location string values based on the human-readable location information in the image and determining the zone of influence based on the plurality of location string values.

7. The method of claim 5 comprising determining a plurality of boundaries of one or more features, and determining the position of the mobile device based on the zone of influence, the plurality of boundaries, and the one or more feature dimension included in the local information.

8. A location assistance application embodied on a non-transient computer-readable storage medium for enabling a distributed computer system, comprising:
    an OCR library code segment configured to store OCR library information associated with a coarse position, wherein the OCR library information is configured to constrain a result generated by an OCR engine; and
    a position information database code segment configured to store local information associated with at least one location string value generated by the OCR engine, wherein the local information includes one or more feature dimensions of objects disposed at or near the coarse position.

9. The location assistance application of claim 8 comprising a measurements code segment configured to store measurement information associated with one or more wireless transmitting devices.

10. A method of providing local information to a mobile device, comprising:
    determining OCR library information and local information based on a coarse location of the mobile device, wherein the OCR library information includes a word list and a character feature file, and the local information includes one or more feature dimensions;
    sending the OCR library information and the local information to the mobile device;
    receiving at least one location string value from the mobile device, wherein the at least one location string value is included in the word list;
    receiving a relative position information from the mobile device, wherein the relative position information is associated with one or more feature dimensions in the local information;
    determining position information based on the at least one location string value and the relative position information; and
    sending the position information to the mobile device.

11. The method of claim 10 comprising receiving coarse location information from the mobile device.

12. The method of claim 10, wherein the OCR library information includes a character feature file.

13. The method of claim 10, wherein the OCR library information includes fixed formatting rules.

14. A system for determining a location of a mobile device, comprising:
- a memory;
- a processor programmed to:
  - determine a coarse location of the mobile device;
  - compute a local information data package based on the coarse location of the mobile device, wherein the local information data package includes one or more zones of influence and feature dimension information associated with each of the zones of influence; and
  - send the local information data package to the mobile device.

15. The system of claim 14 wherein the feature dimension information includes a height and a width dimension for a room identifier.

16. The system of claim 14 wherein the feature dimension information includes a height from floor dimension for the room identifier.

17. The system of claim 14 wherein the processor is programmed to:
- receive an image file from the mobile device;
- analyze the image for feature dimension information;
- determine a position of the mobile device based on the a feature boundary in the image; and
- send the position to the mobile device.

18. The system of claim 14 wherein the local information data package includes OCR library information.

19. The system of claim 14 wherein the processor is programmed to send the local information data package in response to a request sent from the mobile device.

20. A position detecting mobile device, comprising:
- means for determining a coarse position of the mobile device;
- means for capturing position reference information;
- means for receiving a location information data package based on the coarse position of the mobile device, wherein the location information data package includes one or more zones of influence and one or more feature dimensions;
- means for utilizing the location information data package and the captured position reference information to determine a fine position of the mobile device; and
- means for displaying the fine position.

21. The position detecting mobile device of claim 20 wherein the position reference information is an image including human readable text, and the location information data package includes OCR library information.

22. The position detecting mobile device of claim 20 wherein the position reference information is an image of an area, wherein the image includes at least a room identifier and the fine position is determined based on a height and a width of the room identifier.

23. The position detecting mobile device of claim 20 wherein the position reference information is an electromagnetic signal and the location information data package includes a location and detection range of a transmitter that is a source of the electromagnetic signal.

24. The position detecting mobile device of claim 20 wherein the means for determining the coarse position of the mobile device includes a previous SPS location result.

25. A location assistance system for use in a mobile device network, comprising:
- means for determining a coarse position information for a mobile device;
- means for storing OCR library information and local information associated with the coarse position information, wherein the OCR library information includes a character feature file and the local information includes one or more feature dimensions; and
- means for sending a local information data package to the mobile device, wherein the local information data package includes OCR library information and local information associated with the coarse position information.

26. The location assistance system of claim 25 comprising:
- means for receiving at least one location string value from the mobile device;
- means for receiving relative position information from the mobile device;
- means for determining position information based on the at least one location string value and the relative position information; and
- means for providing the position information to the mobile device.

27. A non-transitory computer-readable storage medium having data stored therein representing software executable by a computer, the software including instructions to determine a position of a mobile device, the storage medium comprising:
- instructions for capturing position reference information;
- instructions for receiving a location information data package based on a coarse position of the mobile device, wherein the location data package includes one or more zones of influence and one or more feature dimensions;
- instructions for utilizing the location information package and the captured position reference information to determine a fine position of the mobile device; and
- instructions for displaying the fine position.

28. The storage medium of claim 27 wherein the position reference information is an image of an area including a room identifier with human readable text, and the location data package includes OCR library information.

29. The storage medium of claim 27 further comprising instructions for detecting a range to the room identifier, wherein the range is based on a dimension associated with the room identifier and the one or more feature dimensions included in the location data package.

30. The storage medium of claim 27 further comprising instructions for determining the coarse position of the mobile device.

* * * * *